United States Patent [19]
Day et al.

[11] Patent Number: 5,857,175
[45] Date of Patent: Jan. 5, 1999

[54] SYSTEM AND METHOD FOR OFFERING TARGETED DISCOUNTS TO CUSTOMERS

[75] Inventors: Larry J. Day; Merle S. Weinkauf; Theodore Knutson, all of Spokane, Wash.

[73] Assignee: Micro Enhancement International, Spokane, Wash.

[21] Appl. No.: 514,467

[22] Filed: Aug. 11, 1995

[51] Int. Cl.[6] ................................................... G06F 17/60
[52] U.S. Cl. ................................................ 705/14; 705/10
[58] Field of Search ............................. 395/201; 705/10, 705/14

[56] References Cited

U.S. PATENT DOCUMENTS

| | | |
|---|---|---|
| 3,959,624 | 5/1976 | Kaslow . |
| 4,124,109 | 11/1978 | Bissell et al. . |
| 4,412,631 | 11/1983 | Haker . |
| 4,554,446 | 11/1985 | Murphy et al. . |
| 4,674,041 | 6/1987 | Lemon et al. . |
| 4,723,212 | 2/1988 | Mindrum et al. . |
| 4,882,675 | 11/1989 | Nichtberger et al. . |
| 4,896,791 | 1/1990 | Smith ........................................ 221/7 |
| 5,380,991 | 1/1995 | Valencia et al. . |
| 5,388,165 | 2/1995 | Deaton et al. . |
| 5,459,306 | 10/1995 | Stein et al. .............................. 235/383 |
| 5,515,270 | 5/1996 | Weinblatt . |
| 5,649,114 | 7/1997 | Deaton et al. . |

FOREIGN PATENT DOCUMENTS

PCT/US84/
01450  9/1984  WIPO .

*Primary Examiner*—Emanuel Todd Voeltz
*Assistant Examiner*—William N. Hughet
*Attorney, Agent, or Firm*—Wells, St.John, Roberts, Gregory & Matkin, P.S.

[57] ABSTRACT

A system for presenting customized special offers to customers, the special offers including targeted offers to a customer selected from a plurality of customers, and for collecting purchasing behavior information concerning the customers, the system comprising a computer including a database containing customer account information providing information specific to a particular customer account; the at computer also including a database containing special offers including a targeted offer which is to be made to selected customer accounts on the basis of targeted offer targeting parameters; a plurality of customer cards, each customer card having machine readable card information indicating at least identification of the card with a particular customer account; a customer interface in communication with the computer to transfer data therebetween; the customer interface having a card reader for reading machine readable card information from the customer card; the computer including means for generating a customized customer offer list available to that particular customer account which includes the special offer; an offer communicator for communicating the customer offer list to the customer for which it is generated; a check-out at which the customer presents purchased item information indicating items being purchased by the customer; the check-out including a card reader for reading the customer card; the computer including means for sending information from the customized customer offer list to the check-out; the computer further including means for collecting customer purchase information which is indicative of items being purchased by the customer via the check-out; the computer still further including means for editing the customer account information to reflect items purchased by the customer.

127 Claims, 24 Drawing Sheets

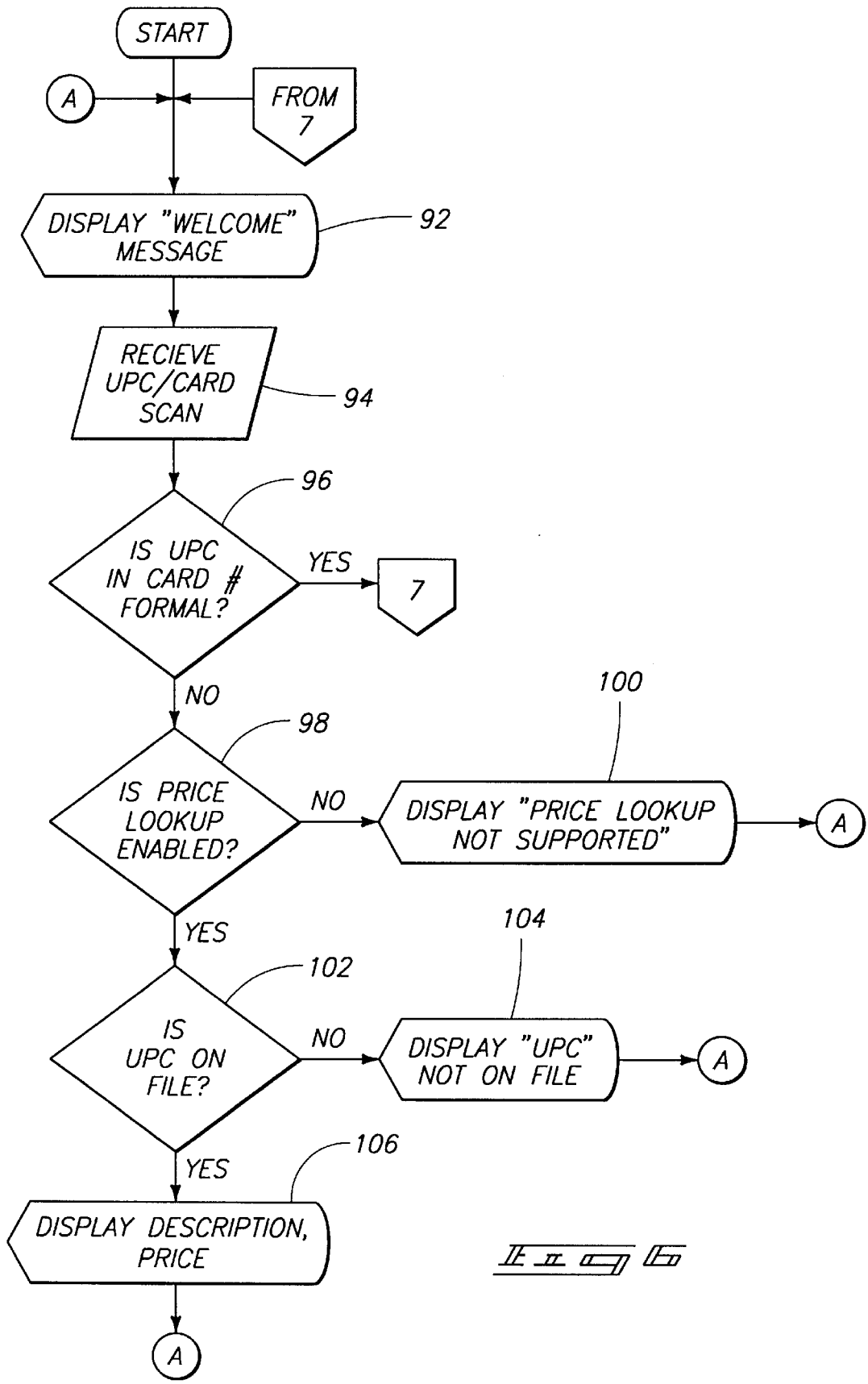

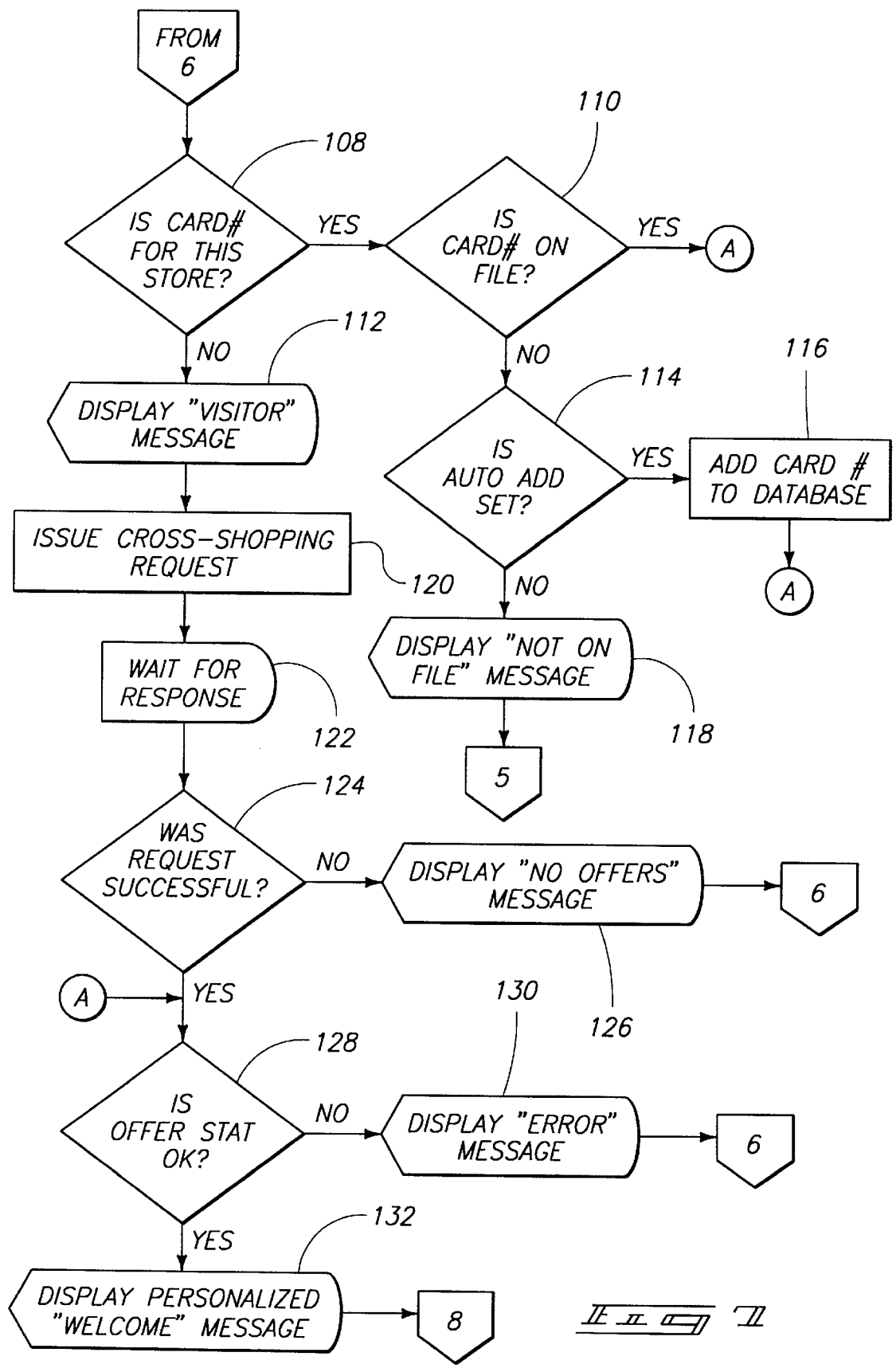

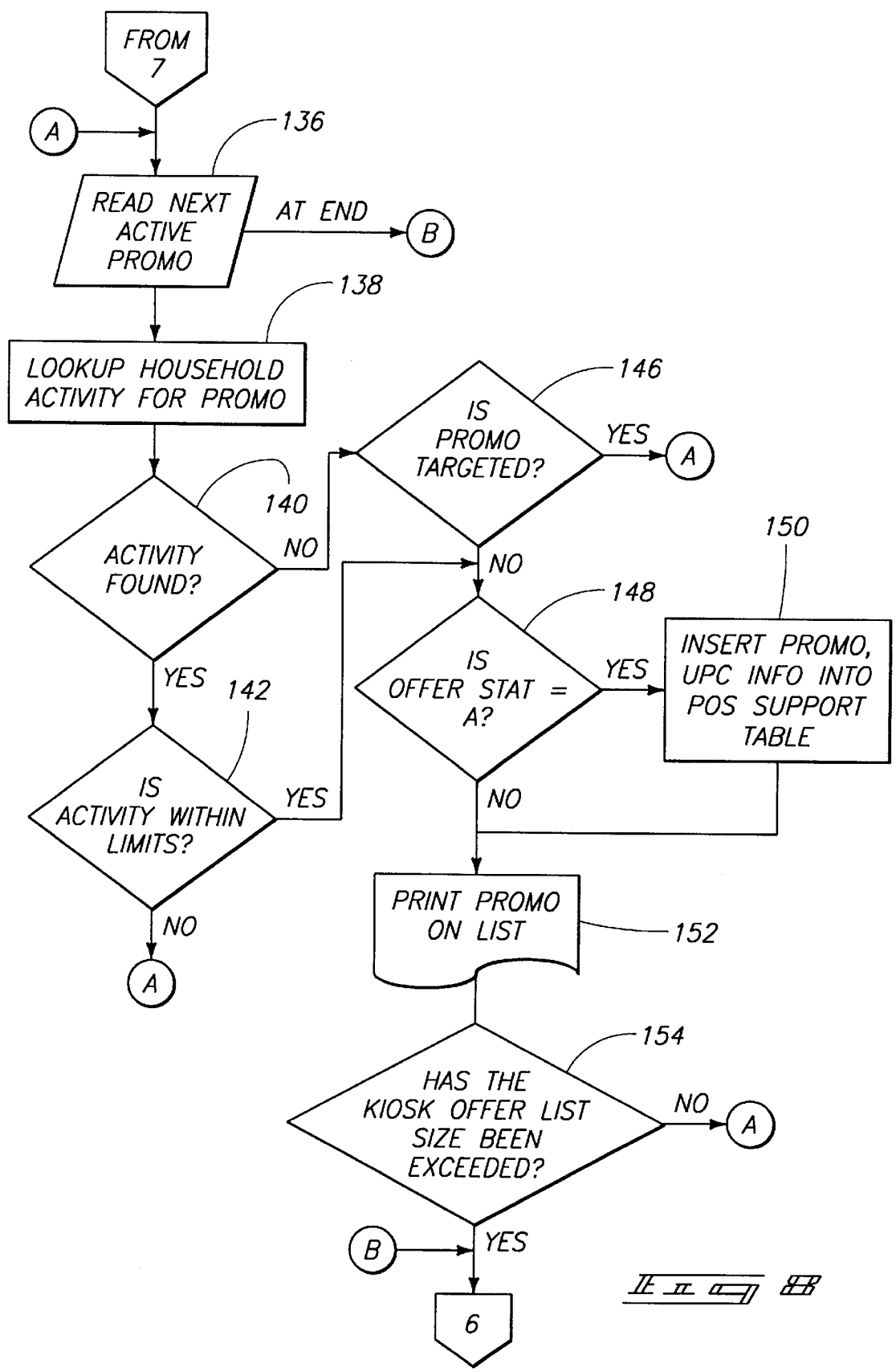

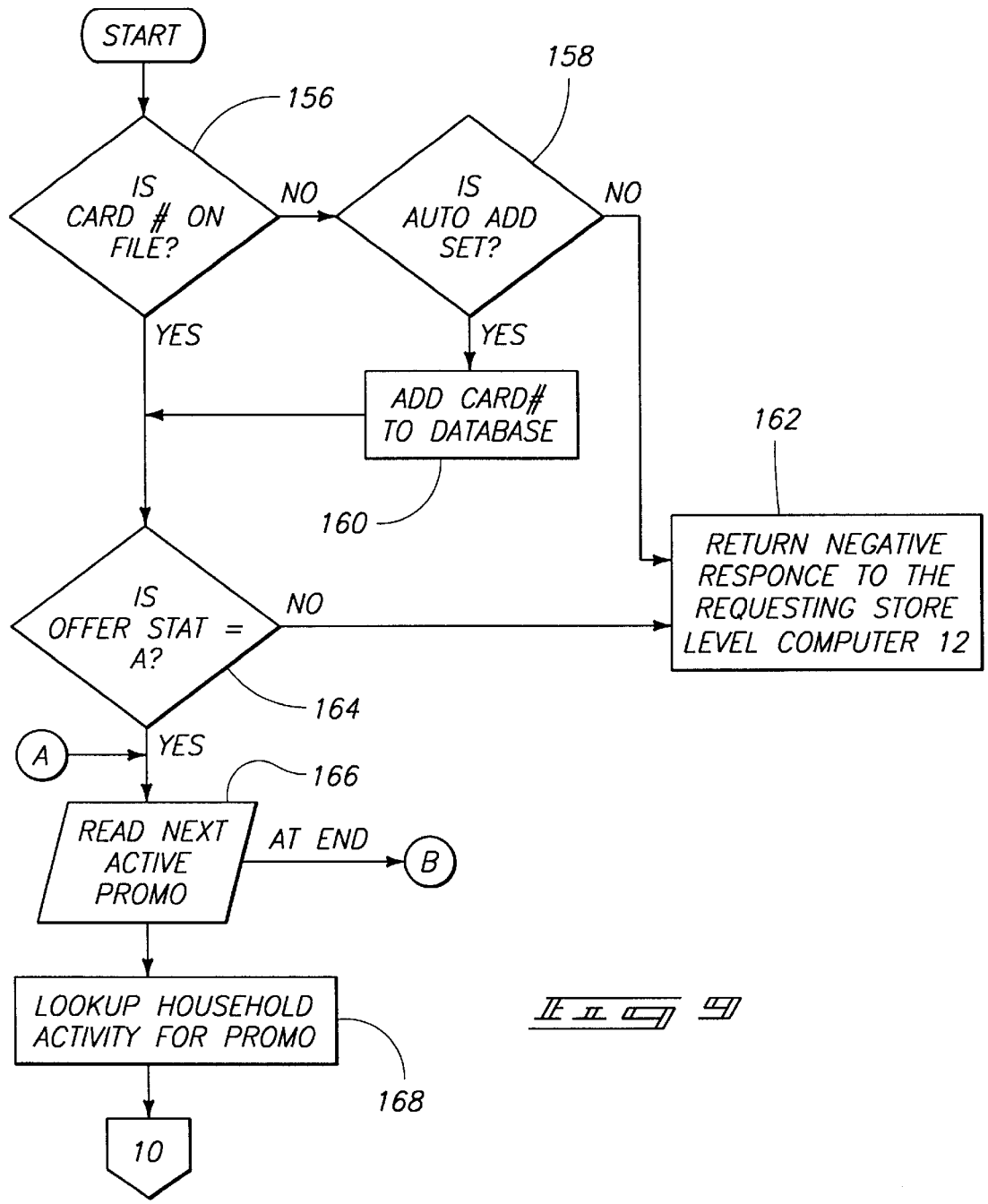

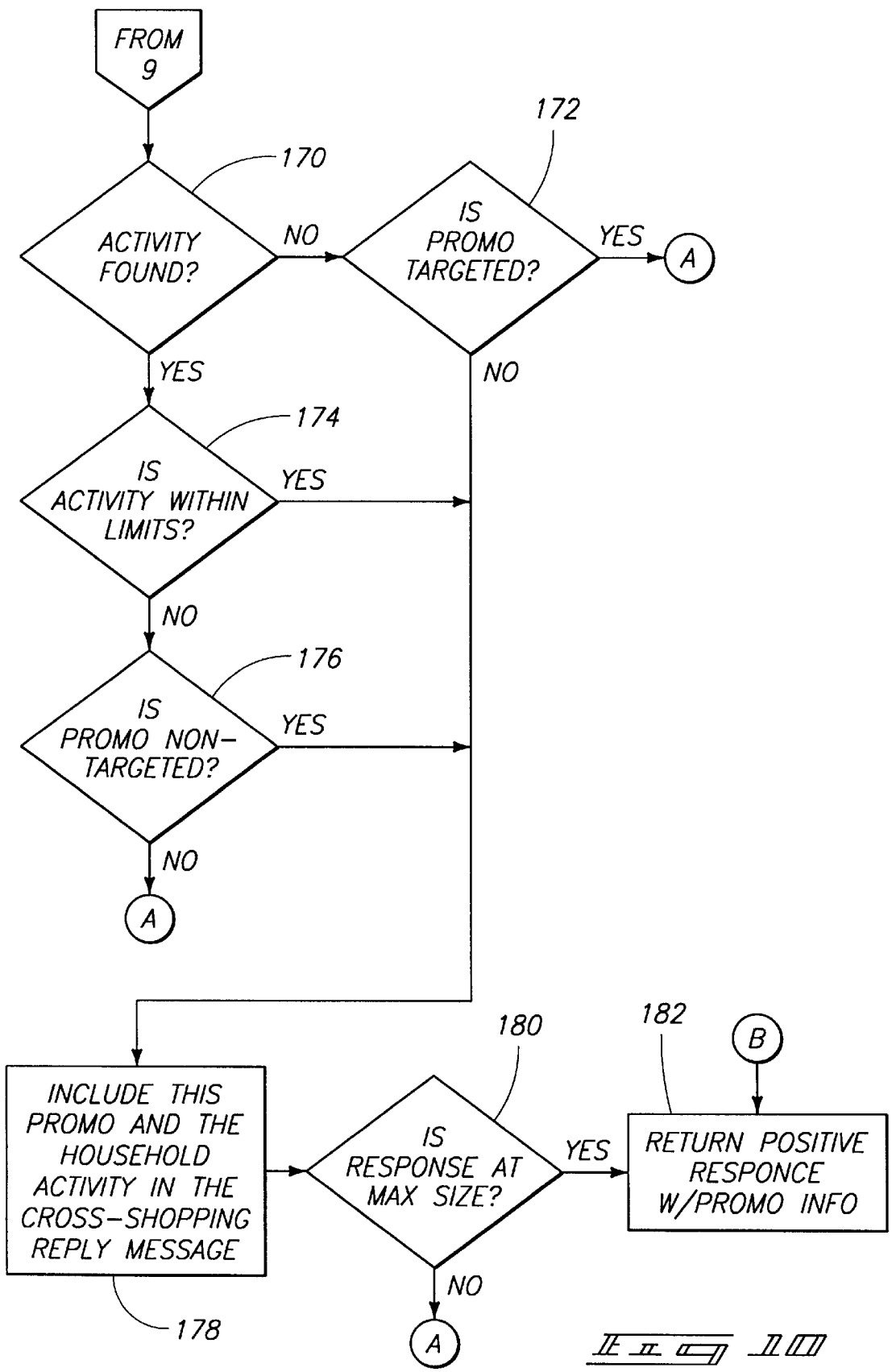

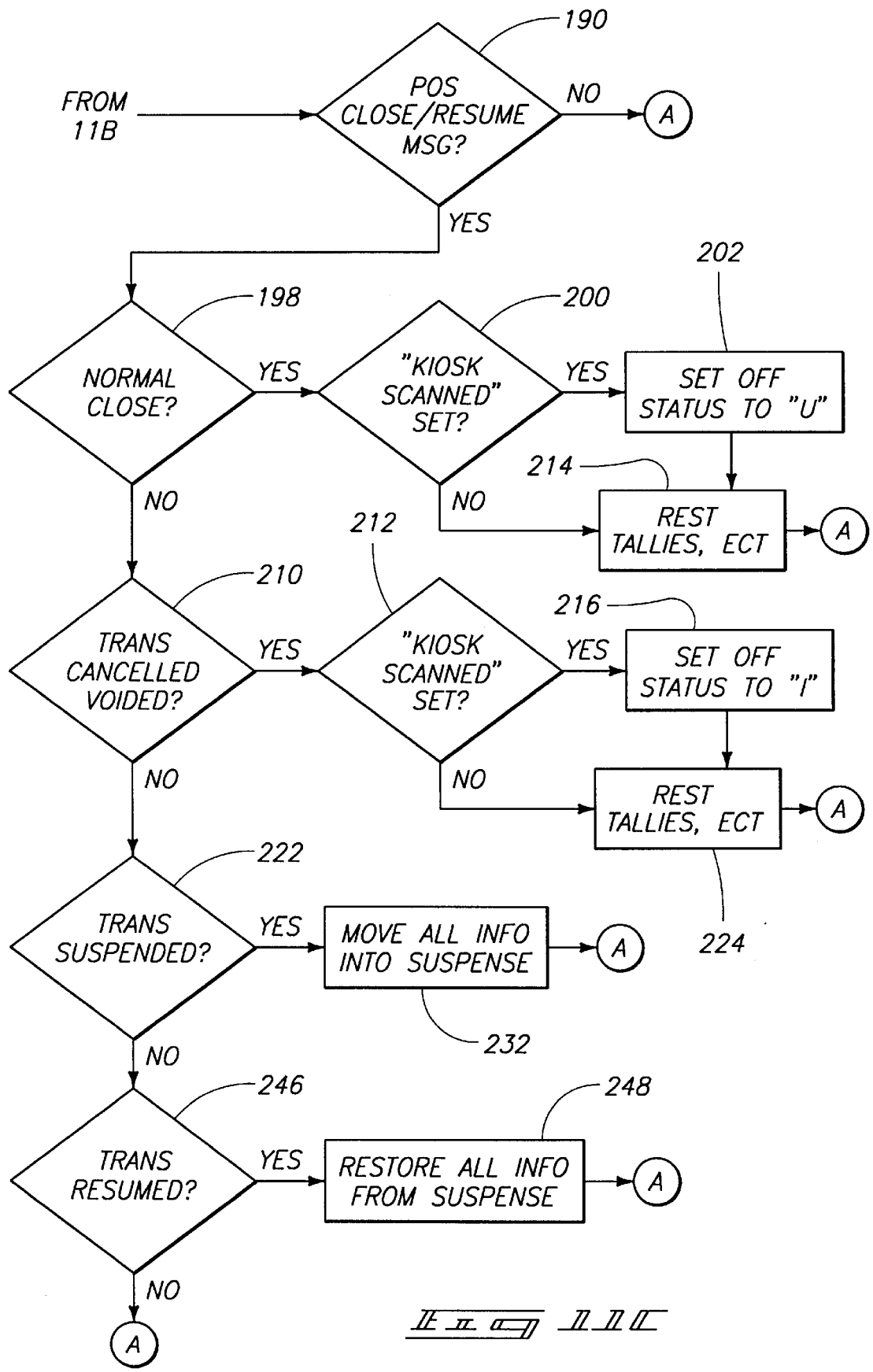

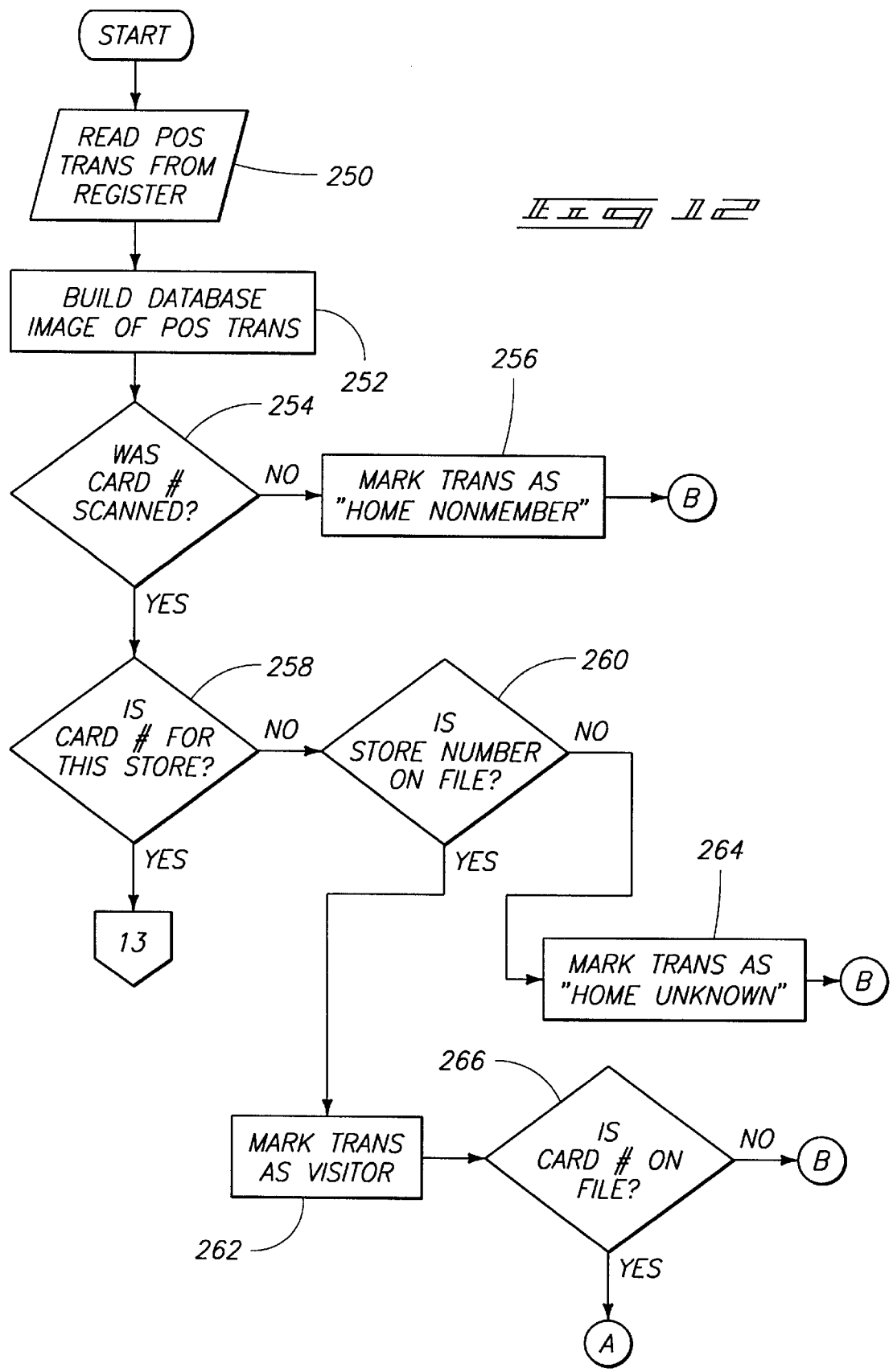

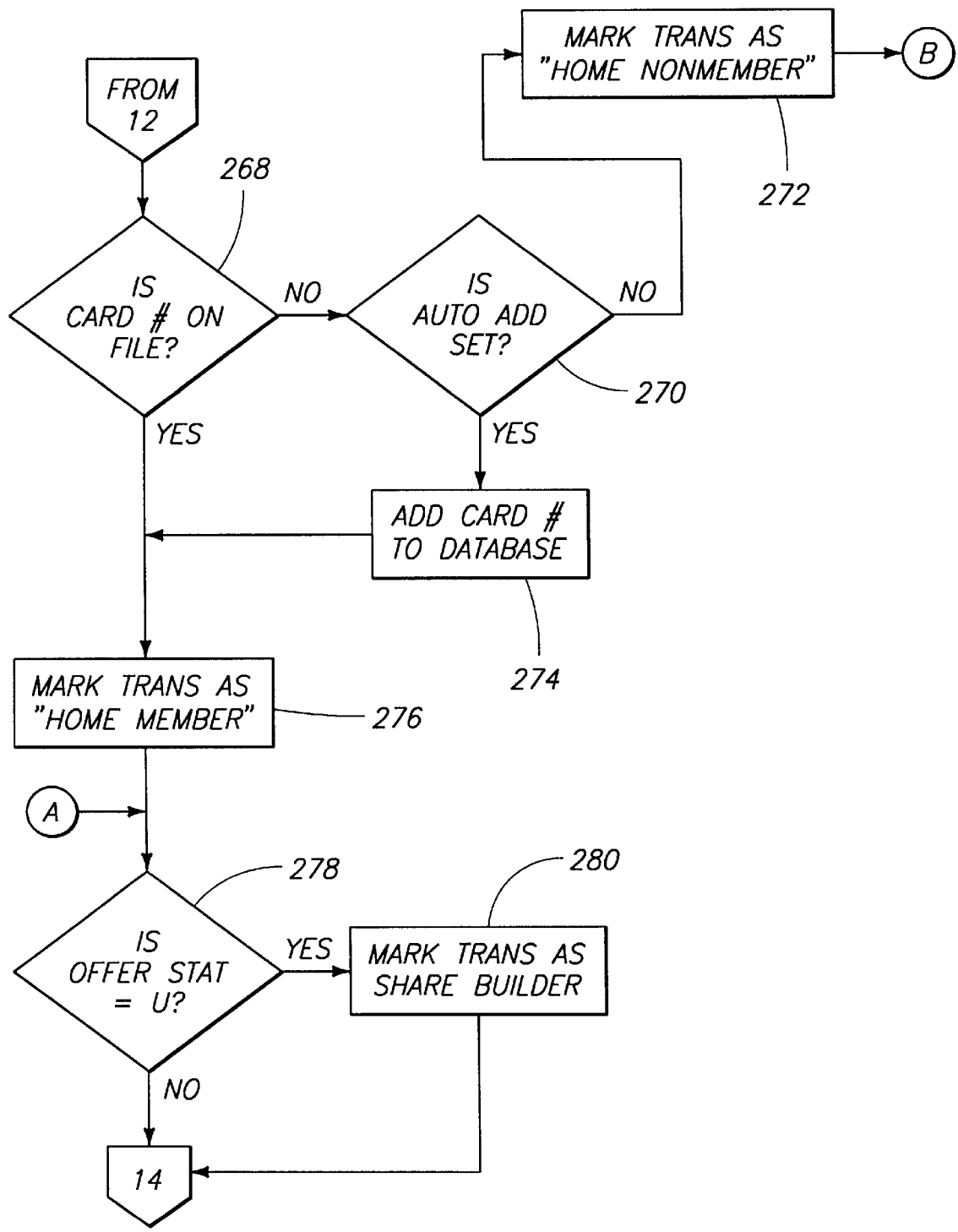

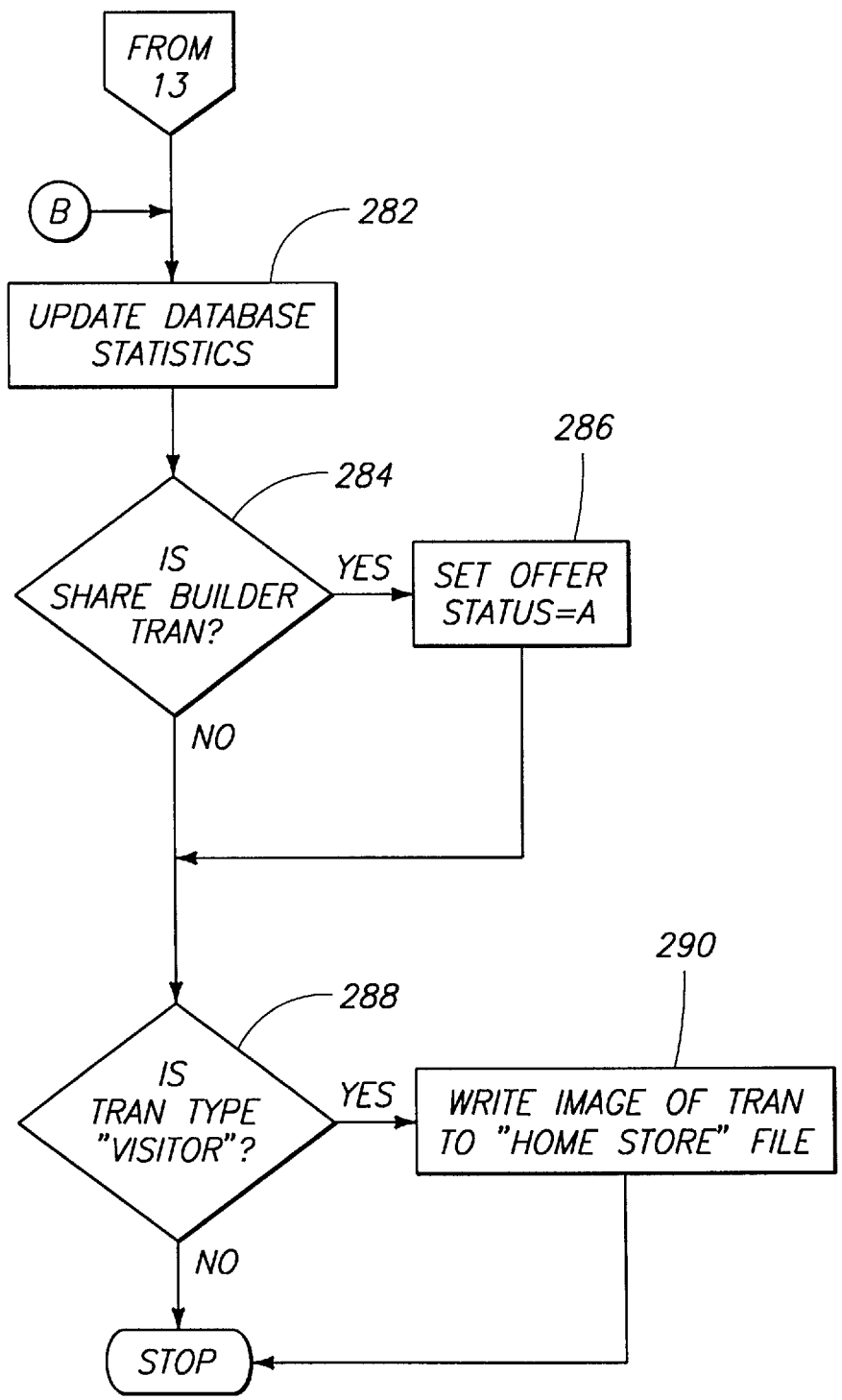

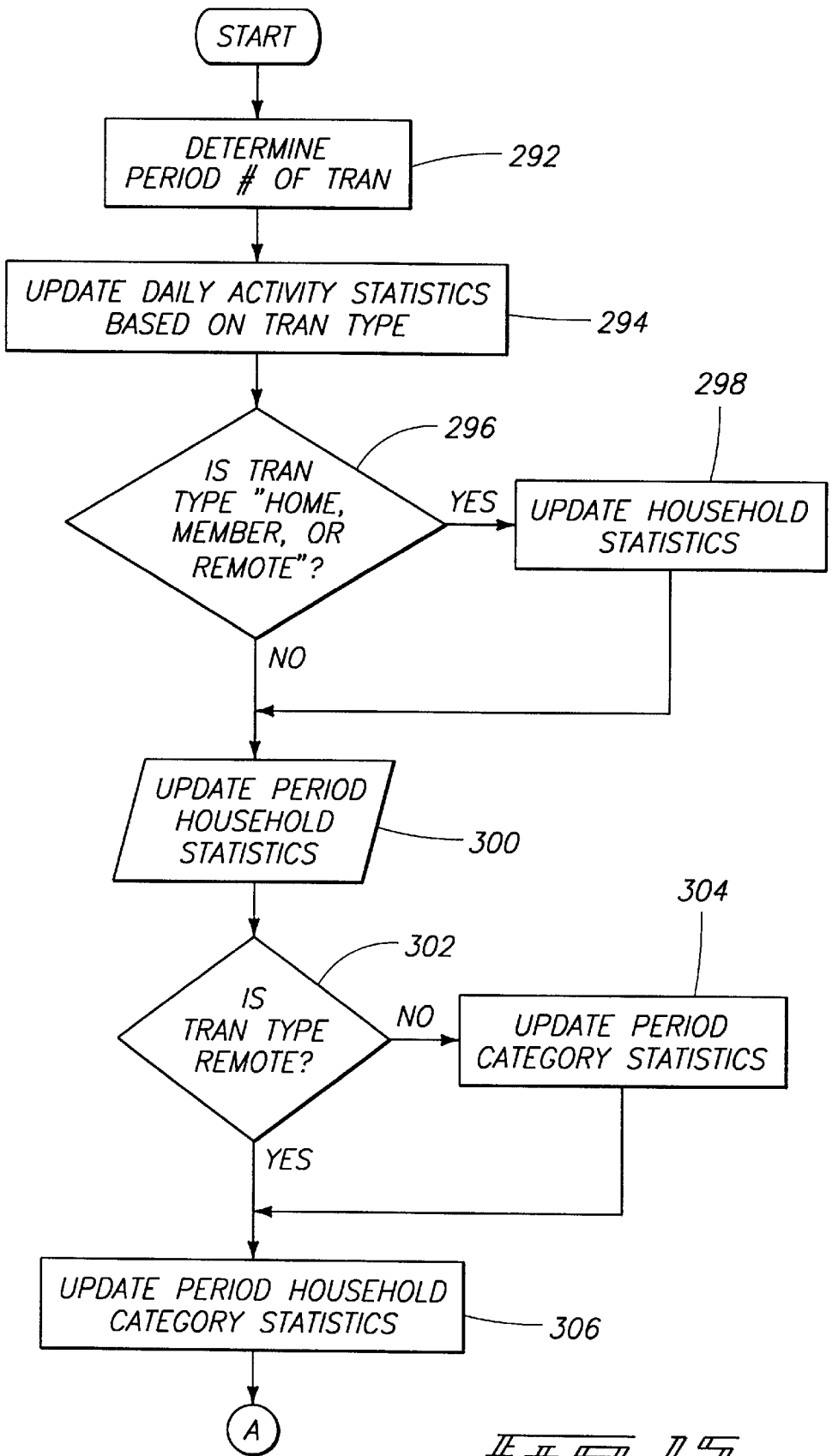

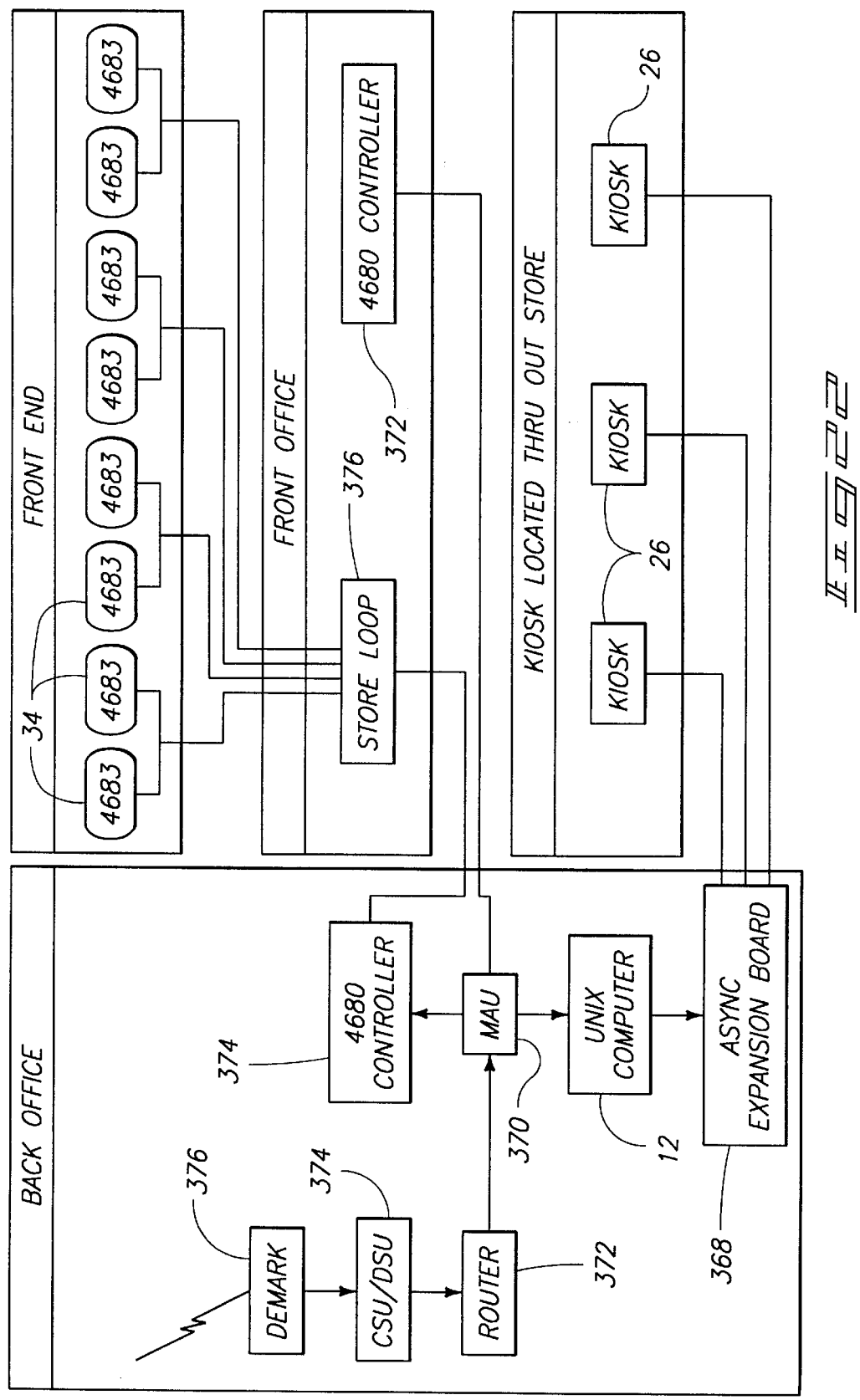

SYSTEM AND METHOD FOR OFFERING TARGETED DISCOUNTS TO CUSTOMERS

TECHNICAL FIELD

The invention relates to a point of sale marketing and purchase behavior monitoring.

BACKGROUND OF THE INVENTION

It is known to provide coupons to consumers in order to attempt to influence their purchasing behavior, for example to entice them to try a new product. Such coupons are typically made available to the general public by mailing coupon packages to large numbers of people, or by including coupons in newspapers.

A problem with using such coupons is that there is a possibility of fraudulent use. It may be possible for a retailer to receive cash for coupons even though they did not sell a manufacturer's product. It may be possible for a consumer to exceed discount limitations per consumer by shopping at multiple different stores. A cashier may not be able to carefully follow the rules associated with a coupon, such as rules requiring a purchaser to buy a certain quantity of the product to be eligible for the discount.

Another problem with using coupons or price discounting is an inability to target a specific segment of the market. Instead, the coupons or discounts are provided to a large number of consumers, many of whom have no interest whatsoever in the particular type of product. For example, consumers who do not own pets would have no interest in pet food coupons or discounts; consumers who do not have a baby would not be interested in coupons or discounts for baby food or items; vegetarians would not be interested in coupons or discounts for meat, etc. Thus, a great quantity of advertising is wasted on people who have no interest in the items being offered.

Another disadvantage of the current coupon system is the great expense in having a clearing house through which coupons are physically delivered for redemption. Associated therewith are handling costs incurred by the national store, clearinghouse, and manufacturer. These costs are typically borne by the manufacturer or other distributor of the product.

Further, there are circumstances in which a retailer or manufacturer would only be interested in offering coupons to certain consumers, such as to reward repeat purchasers or quantity purchasers, or to entice consumers of competitors products to switch brands. The retailer or manufacturer may have a limited budget and may only be interested in providing coupons to consumers who purchase goods of a certain type, or in a certain quantity. This is difficult or impossible using most or all prior systems.

It is also known to generate and sell mailing lists of consumers who have certain tendencies or who purchase certain items. People who purchase items by mail order quickly find themselves receiving catalogs and information from other retailers who sell similar or related products. Mailing lists are valuable because they provide useful information about consumers, and permit targeted marketing. It would be valuable to be able to collect information about buying habits of particular individuals other than just those who purchase through mail order services.

U.S. Pat. No. 4,882,675 (incorporated by reference) discloses a paperless coupon system. Consumers each have a card having thereon a UPC code. The consumers access a terminal and make selections from possible available coupons prior to beginning shopping. A shopping list of coupons is then presented to the consumer. There is a link to check-out stations, and discounts selected by the consumer are subtracted from the consumers total bill. Optionally, data regarding the consumers purchases is captured.

U.S. Pat. No. 4,723,212 (incorporated by reference) discloses a system for printing coupons when a consumer purchases a competitor's product.

U.S. Pat. No. 4,674,041 (incorporated by reference) and WO85/01373 disclose systems including terminals which receive magnetic cards, and which dispense coupons available to a particular consumer. The terminals communicate with a host computer, and the system provides for overall limits on a discount throughout the entire terminal system so that a manufacturer can put a maximum cap or limit on a promotion for the entire terminal system. Coupons per store can be limited as well.

U.S. Pat. No. 4,412,631 (incorporated by reference) discloses dispensed cards which are used for imprinting onto coupons. This reduces the opportunity for fraud.

U.S. Pat. No. 4,124,109 discloses a coupon dispenser which receives a card having a magnetic strip, which card includes indicia indicating the last time it was used.

U.S. Pat. No. 3,959,624 (incorporated by reference) discloses coupons having UPC bar codes thereon. The UPCs on coupons presented at check-out time must match UPCs for products purchased before discounts will be applied to a consumer's bill. Similarly, U.S. Pat. No. 4,554,446 (incorporated by reference) discloses scannable coupons.

A system including a supervisory computer communicating with store level computers, and providing for targeted special offers was is installed for experimental testing in a joint development arrangement in June, 1994.

SUMMARY OF THE INVENTION

The invention provides a paperless coupon system which tracks consumer purchasing behavior. The system presents special offers (promotions) to customers. The special offers include customized targeted offers for specific customers. The invention allows manufacturers to select which consumers obtain discounts and how big of a discount.

BRIEF DESCRIPTION OF THE DRAWINGS

Preferred embodiments of the invention are described below with reference to the accompanying drawings, which are briefly described below.

FIGS. 6–10 are flow charts illustrating activity at a kiosk which a customer uses to obtain a list of special offers.

FIGS. 12–14 are flow charts illustrating transactional analysis that takes place at a check-out (point of sale terminal).

FIGS. 15–17 are flow charts illustrating updating of database statistics.

FIG. 22 is a block diagram illustrating hardware components and cabling for a store employing IBM (trademark) check-outs.

DETAILED DESCRIPTION OF THE PREFERRED EMBODIMENTS

Figure 1:
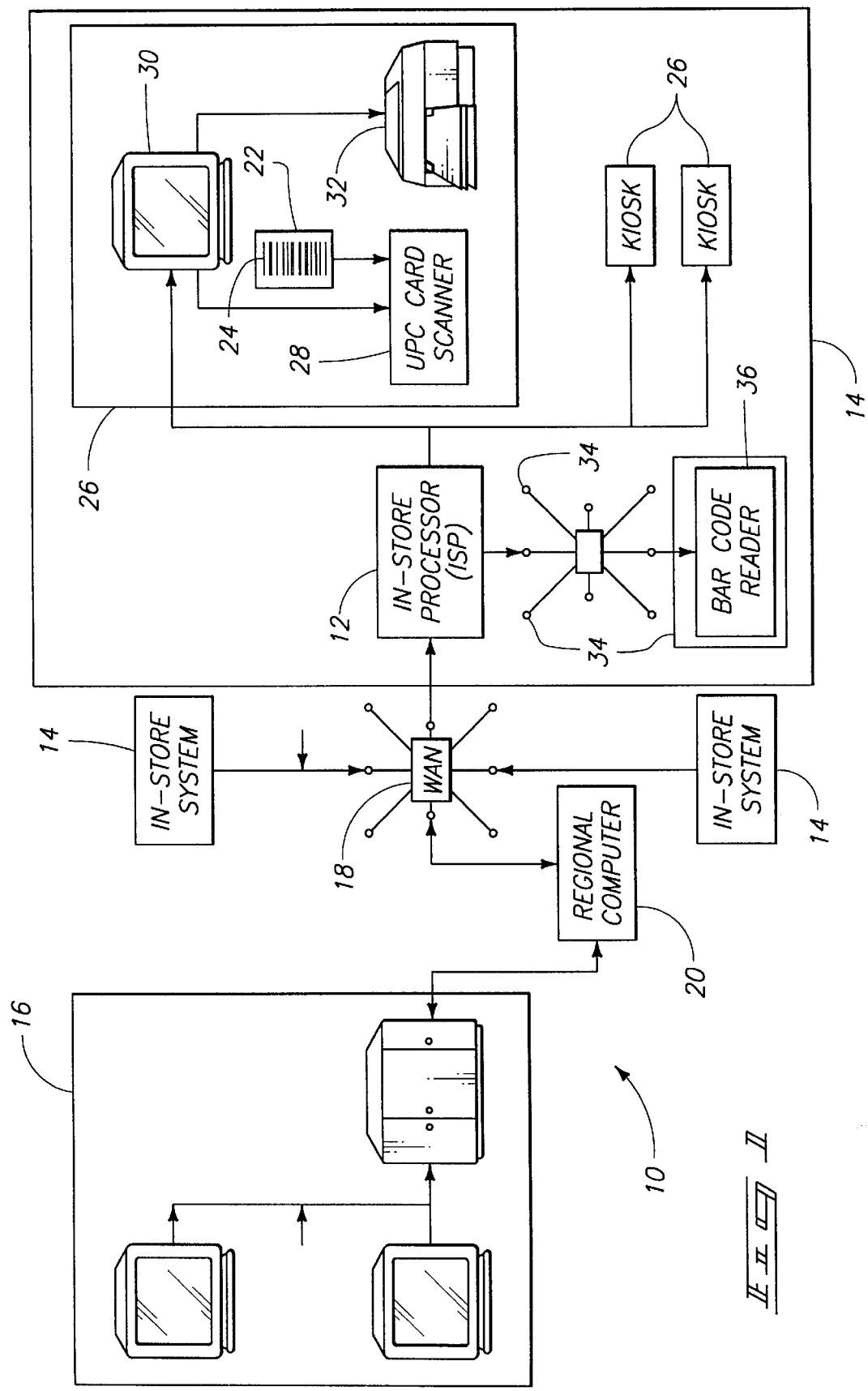
FIG. 1 is a block diagram of a system embodying the invention.

FIG. 1 shows a system 10 embodying the invention. The system 10 includes a plurality of store level computers or in store processors 12. One store level computer 12 is included in each of various stores, shops, or retail outlets 14. As all the stores 14 include is equipment that operates in substantially a similar manner, only one store 14 will be described.

Each computer 12 includes a database containing customer account information, including information regarding purchases made by individual customers. Each computer 12 further includes a database of special offers including customized targeted offers to be made to selected customer accounts on the basis of targeted offer targeting parameters. While various other types of computers can be employed, in the illustrated embodiment the computer 12 is a UNIX machine.

The system 10 further includes a supervisory computer 16 networked to the store level computers 12 via a wide area network 18. Any appropriate networking technique can be used, such as satellite communication between the supervisory computer 16 and one or more of the store level computers 12, or TCP/IP communication.

The supervisory computer is used to perform special offer maintenance, category management, network administration, system administration, and is optionally used for software distribution. The store level computers 12 can comprise computers for one chain or franchise or stores 14, or can comprise computers for several chains or stores. This will become more clear upon review of the following description.

Optionally, regional computers 20 are interposed between the supervisory computer 16 and the store level computers 12 to assist in data storage, analysis and targeted marketing. A regional computer 20 would be connected to several store level computers 12 of one or more chains in a certain geographic area. Executives from a head office of a chain of stores can connect to the regional computer (e.g., via a dial-up or TCP/IP connection) and obtain reports relating to their chain of stores, or relating to individual stores in their chain.

The supervisory computer 16 periodically downloads special offers to the store level computers. More particularly, the administrators of the supervisory computer 16 communicate with various manufacturers, and determine what targeting parameters the manufacturers want to use in making special offers. The manufacturers may wish to make special offers to all customers (broadcast special offers), or only to customers who meet certain criteria (targeted offers). For example, the manufacturer may wish to offer discounts of varying degrees to customers who have not settled on a brand and frequently switch brands. The amount of discount may vary depending on the quantity of that category of product that the customer purchases. Similarly, a manufacturer may wish of offer discounts of varying degrees to loyal customers who mostly purchase the manufacturer's products, to reward loyal customers. Or a manufacturer trying to gain market share may only wish to provide discounts to loyal customers of a competitor, or may decide to offer higher discounts to loyal customers of a competitor than to switchers.

Thus, the targeting parameters may include whether the customer is a switcher (e.g., a customer who purchases a certain brand of product sometimes, and other brands of the same category of product other times). A switcher may be defined as a customer who purchases a certain brand of product a certain percentage of the time, such as 40% of the time. The targeting parameters may include whether the customer is a loyal (e.g., a customer who purchases a certain brand of product most of the time, and other brands of the same category of product other times). A loyal customer may be defined as a customer who purchases a certain brand of product a certain percentage of the time, such as 80% of the time. The targeting parameters may include quantity parameters. For example, heavy, moderate, light, or never quantities parameters may be established.

The system 10 further includes a plurality of cards 22. Each card has thereon machine readable information for associating the card with particular customer and customer account, and with a particular store in the chain. In the illustrated embodiment, the card 22 has thereon a UPC code 24. The UPC code identifies the customer and identifies the customer's home store. Every customer has a home store where they set up their account, and where some of their records relating to their purchase behavior are kept. In alternative embodiments, the machine readable information of the card 22 is contained in a magnetic strip, or the card 22 is a smart card. Any other suitable means of storing information in a card can be employed. Similarly, any other means of identifying a customer can be employed instead of the cards and the card readers described below (e.g., passwords, fingerprint scans, retinal scans, etc. are employed in alternative embodiments).

At least one kiosk 26 is placed in each store 14. The kiosk 26 is a booth or housing. Preferably, at least one kiosk 26 is located near the entrance of the store 14. One or more additional kiosks can be located in other parts of the store frequented by customers. The system 10 further comprises a customer interface 28 housed in each kiosk 26 and in communication with the store level computer 12 associated with the store in which the kiosk 26 is located. In the illustrated embodiment, the customer interface comprises a card reader 28 including means for reading the machine readable information on the card, for sending information from the card to the store level computer 12 of the store where the kiosk is located. In the illustrated embodiment, the customer interface comprises a dumb terminal 30 connecting the card reader 28 to the store level computer 12. Other customer interfaces can be employed, such as interactive terminals, touch screen interfaces, etc.

The kiosk 26 also houses an offer communicator (offer communicator means) 32 for communicating respective individualized lists of special offers to customers who access the customer interface. While various offer communicators could be employed, in the illustrated embodiment the offer communicator comprises a printer. The printer 32 is preferably a high speed printer, such as a thermal printer, so as to enable quick processing of customers at the kiosk 26 to keep lines at the kiosk 26 down to a minimum. In one embodiment, the printer 32 prints at least 500 lines per minute. More particularly, the printer 32 is a thermal strip printer which prints 600 lines per minute. Other high speed printers can be employed.

The kiosks 26 can also be used by customers to check prices of products. For example, some state laws require that bar code readers be distributed throughout a store so that customers can scan bar codes on products to check prices. The kiosks 26 are capable of being used for this purpose.

The system 10 further comprises one or more check-outs or point-of-sale terminals 34 in each store. These are spaced apart from the kiosks 26, which are preferably located in a different area of the store. The check-outs 34 in a store are in communication with the store level computer 12 associated with the same store. The check-outs 34 include readers which read the cards 22 in addition to products. More particularly, in the illustrated embodiment, the check-outs 34 include bar code readers which read UPC codes on the products, as well as UPC codes 24 on the cards 22.

In operation, a customer sets up an account with a store and receives one of the cards 22. Then, whenever the customer goes shopping, he or she goes to one of the kiosks before beginning shopping and presents the card 22 to the customer interface 28. The store level computer 12 includes means for accessing information about the special offers available to the customer associated with the card, and generates a customized list of special offers available to that particular customer. More particularly, the computer 12 determines what special offers are available to this customer, and sends a list of special offers to the offer communicator 32. The customer then has a shopping list of special offers to use while shopping. The customer does not engage in any selection process, but instead is quickly processed at the kiosk. The customer then has a limited time, e.g. 3 hours, to take advantage of the special offers before they expire.

The first few times the customer uses the card 22, the computer 12 will have little information about the customer's buying habits. Therefore, the special offers available to that customer may not contain many targeted special offers. To keep the customer interested in using the card, while purchasing behavior information is being obtained, the customer will be given broadcast special offers, which are special offers available to everyone (as opposed to targeted special offers). In addition, the customer may be entitled to a frequent shopper plan (similar to frequent flyer plans) or to a lottery if he or she uses the card 22. The frequent shopper plan awards points based on amount of use of the card 22 or based on amounts spent in the store. A lottery number can be printed on the shopping list by the printer 32, for later comparison by the shopper with a list of randomly selected winners, or the shopping list can include an indication as to whether or not the customer is a winner. The prizes for the winner of the lottery can include bonus frequent shopper points, product discounts, cash awards, etc.

In one embodiment, the total number of listed special offers (including both broadcast special offers and targeted special offers) is the same for each customer. A predetermined number of special offers ("slots") thus appears on a customer's shopping list, and the predetermined number is the same for each customer. In one embodiment, the predetermined number of special offers are the highest value special offers available to the particular customer (e.g., highest value calculated on the basis of percentage reduction in price). The highest value special offers will typically be targeted special offers, and the remaining of the predetermined number will be filled using broadcast special offers.

However, it is possible that some broadcast special offers will be more valuable than targeted special offers, and it may thus be possible for the predetermined number to exclude a targeted special offer but include a broadcast special offer. It is also possible for a certain number of "slots" to be reserved for offers from specific promotion sources; e.g., the supervisory computer 16, the manager of the in-store computer 14, the chain management of the in-store computer 14, or the primary grocery wholesaler to the store. In one embodiment, 50% of the "slots" are reserved for offers received from the supervisory computer 16 and 50% of the slots are reserved for offers received from the primary wholesaler to the store.

After the customer finishes shopping, the customer presents his or her card 22 to the check-out 34, where the card 22 is scanned before or while purchases are rung up. The system 10 includes means for associating a purchased product with a customer account if one of the cards 22 is scanned by the bar code reader 36 in sequence with scanning of products. More particularly, a list of all products for which special offers exist for at least one customer is downloaded from the store level computer to the check-out 34 at appropriate times, after special offer programs are initiated. The check-out 34 then has a list of all products for which discounts may be available to certain customers. If a customer purchases a product which is included in this list, the check-out 34 communicates with the store level computer 12 to determine if a special offer is available to the particular customer whose card 22 was scanned by the check-out 34 in sequence with the products, and to determine the value of the special offer for this customer. The check-out 34 applies any special offers available to that customer to the customer's total if the customer purchased products for which special offers were available to the customer. In one embodiment, if a product that is currently on promotion to at least one customer is scanned at the check-out 34 before the customer's card 22 is scanned, the check-out register 34 communicates the purchase to the store level computer 12 but does not necessarily wait for a response from the store level computer 12. If or when the customer card 22 is finally scanned at the check-out register 34 as part of the shopping trip, the check-out 34 communicates the card number of the customer card 22 to the store level computer 12. The store level computer 12 then communicates to the check-out register 34 each discount that the consumer qualified for because of the product purchases made in this shopping trip prior to the scan of the customer card 22. Subsequent discounts are then received by the check-out 34 immediately following the scan of a qualifying product, as previously presented.

Special offers that were accepted by the customer, and that are restricted to a certain quantity of product, will not be available to the customer the next time the customer accesses the kiosk 26 if the quantity limit has been reached. Thus, double couponing (where a customer uses the same coupon in different stores to avoid quantity limits) is avoided. The check-out sends to the computer 12 information regarding all purchases made by the customer.

Optionally, members of a household could be treated as a single customer, so that they can take advantage of combined purchasing power. The members of the household would then all have cards associating them with the same customer account in the computer 12. The computer 12 identifies which customers should be treated as a household, such as if two customers have the same address. Thus, the two customers that should belong to the same household can optionally be given the option of being treated as a household. Members of a same household may opt out of being treated as a single household. For example, college students living at home may not be interested in targeted special offers that are made to the rest of the household. If the household has a baby, the college students may not be interested in obtaining targeted special offers relating to baby food or supplies.

The system 10 maintains and may communicate to each customer who uses a card 22 a running total of savings realized by that customer since the customer started using the card 22. In one embodiment, the running total of savings is communicated to the customer by the check-out 34, such as by printing the running total on the customer's receipt.

When targeted special offers are set up, the administrators of the supervisory computer 16 communicate with manufacturers, and determine who the manufacturers want to target. The manufacturers provide targeted offer targeting parameters in the form of criteria a customer must meet in order to be eligible for a particular targeted offer. Before the targeted special offers go into effect, a staging operation takes place during which either the supervisory computer 16 or the store level computer 12 determines which customers in the customer account databases meet the criteria. Each special offer is typically set, using the supervisory computer 16, to automatically expire on a certain date, after which date the special offer will no longer be printed on the shopping lists.

The system 10 further comprises means for defining, using the supervisory computer, categories of products, and means for providing category exclusivity, wherein the system only permits special offers for one brand of product per category. Each product falls within a category, such as meat, beverages, baby supplies, etc. When targeted special offers are set up, the supervisory computer 16 will not allow a targeted special offer to be set up for a store if there is a special offer for a competitor's product of the same category available during the same time frame at the same store.

If a customer uses his or her card 22 at a customer interface 28 in a store other than their home store, the store level computer 12 communicates with the customer's home store and the customer's account is accessed even though the customer is not in his or her home store. Thus, the customer can obtain a list of special offers even when shopping at another store of a chain of stores. In one embodiment, the customer can obtain a list of special offers even when presenting a card 22 from a competitor's chain of stores. The competitor's chain of stores will automatically set up a new account and at least provide broadcast special offers to the customer while purchase behavior information is collected in a store level computer of the competitor's chain of stores.

The system further comprises means for preventing a special offer from being communicated by the offer communicator 32 if the product associated with the special offer is out of stock. More particularly, if a store manager learns that a certain product is out of stock or low of stock, he or she can access the store level computer 12 and prevent the offer communicators 32 in his or her store from printing any more special offers for the out of stock product.

The system 10 further comprises means for automatically increasing the value of a special offer available to a customer for a product if the customer previously did not purchase that product after one of the offer communicators communicated a discount for that product to the customer, and means for communicating the increased value special offer to the customer when the customer subsequently presents the customer's card to one of the customer interfaces. A manufacturer may wish to increase a targeted special offer available to a customer if the customer did not purchase a product for which a targeted special offer was available. For example, if the value of the targeted special offer is increased, a loyal customer may be enticed to try a different brand. When the targeted special offer is set up, using the supervisory computer 16, the targeted special offer is selected to automatically increase if not accepted by customers meeting certain parameters.

The supervisor computer 16 further comprises means for generating a report of the effectiveness of special offers (including targeted special offers) in causing customers to purchase products. For example, a manufacturer may want to know whether a targeted special offer increased their sales. Because the store level computers maintain records of purchase behavior, the supervisory computer 16 is capable of printing out reports of whether targeted special offers were accepted, and with what amount of success. NOTE: Records of purchase behavior may be maintained at the customer's home store system 14, at a regional computer system 20, at the supervisory computer 16, or at any combination of these computer locations. The "closest" record system will always be accessed by the system 10, as required.

The system 10 also provides for the possibility of presenting special offers based on repurchase cycles. If a customer just bought a product, a targeted special offer can be presented to that customer at a time when it is expected that the customer would run out of the product and would need to purchase more of the product.

The system 10 provides many advantages. The likelihood of special offers being accepted is higher than if paper coupons are used. There is no need to select, clip, and carry coupons. The problem of coupon fraud is reduced. Control over timing of special offers is increased. Manufacturers can be provided with category exclusivity. The possibility of double couponing is reduced. The distribution of special offers within a store is capable of being limited. Statistical analysis of customer behavior can be performed. Because of the ability to narrowly target customers, manufacturers are more likely to provide increased value special offers to customers, and this increases the likelihood of acceptance as compared to an untargeted approach. In an untargeted system, a loyal customer of a certain brand may receive special offers for the brand that the loyal customer would buy anyway. In applicant's system, the loyal customer would only receive the special offer if the manufacturer so desires.

Various detailed flow charts are provided which illustrate logic employed in one embodiment of the invention. This application is intended to cover broader aspects of the invention. The description of the flow charts is provided merely to better enable one of ordinary skill in the art to implement the invention without undue experimentation.

Figure 2:
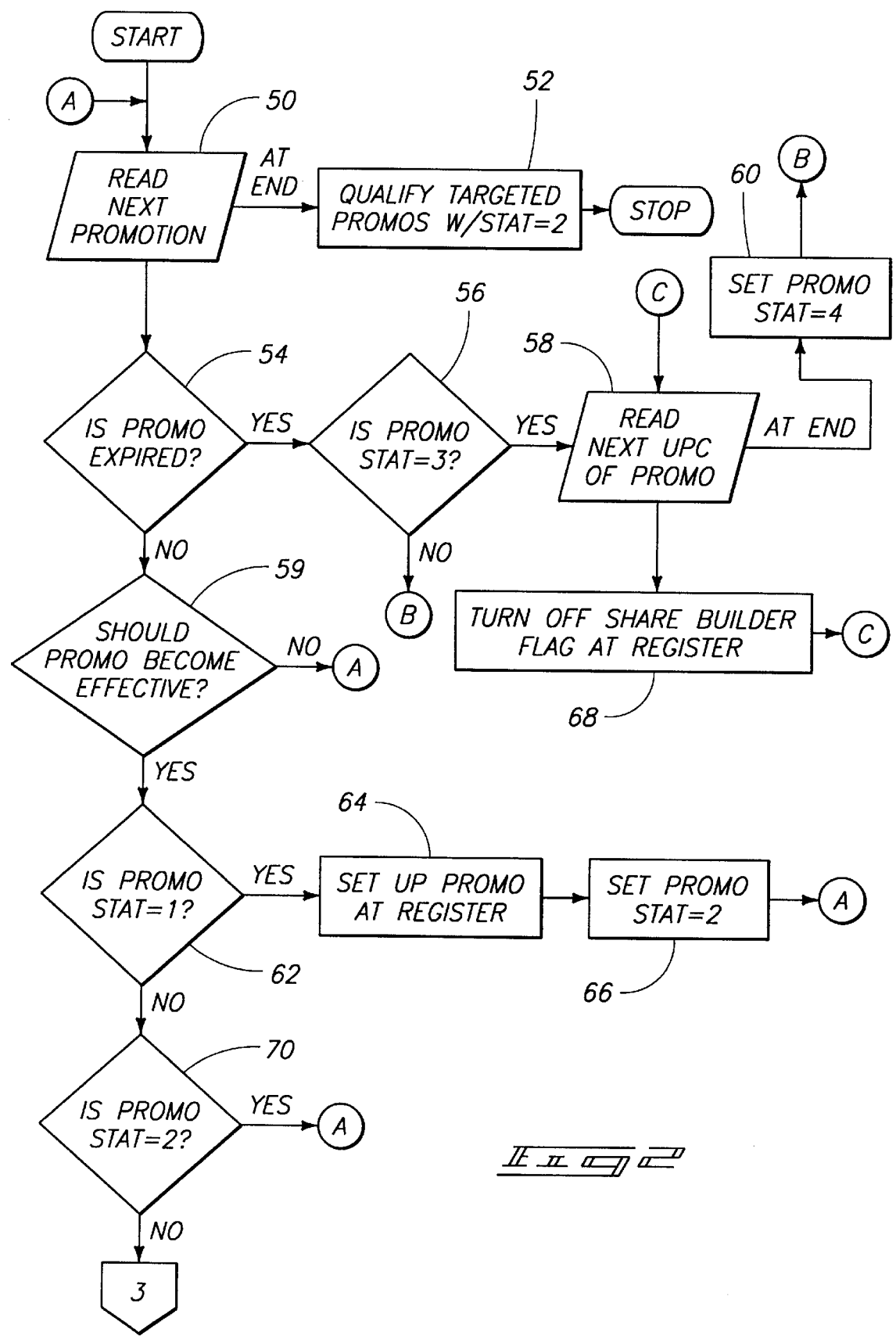
FIGS. 2–3 are flow charts illustrating store level special offer (promotional) staging.
Figure 3:
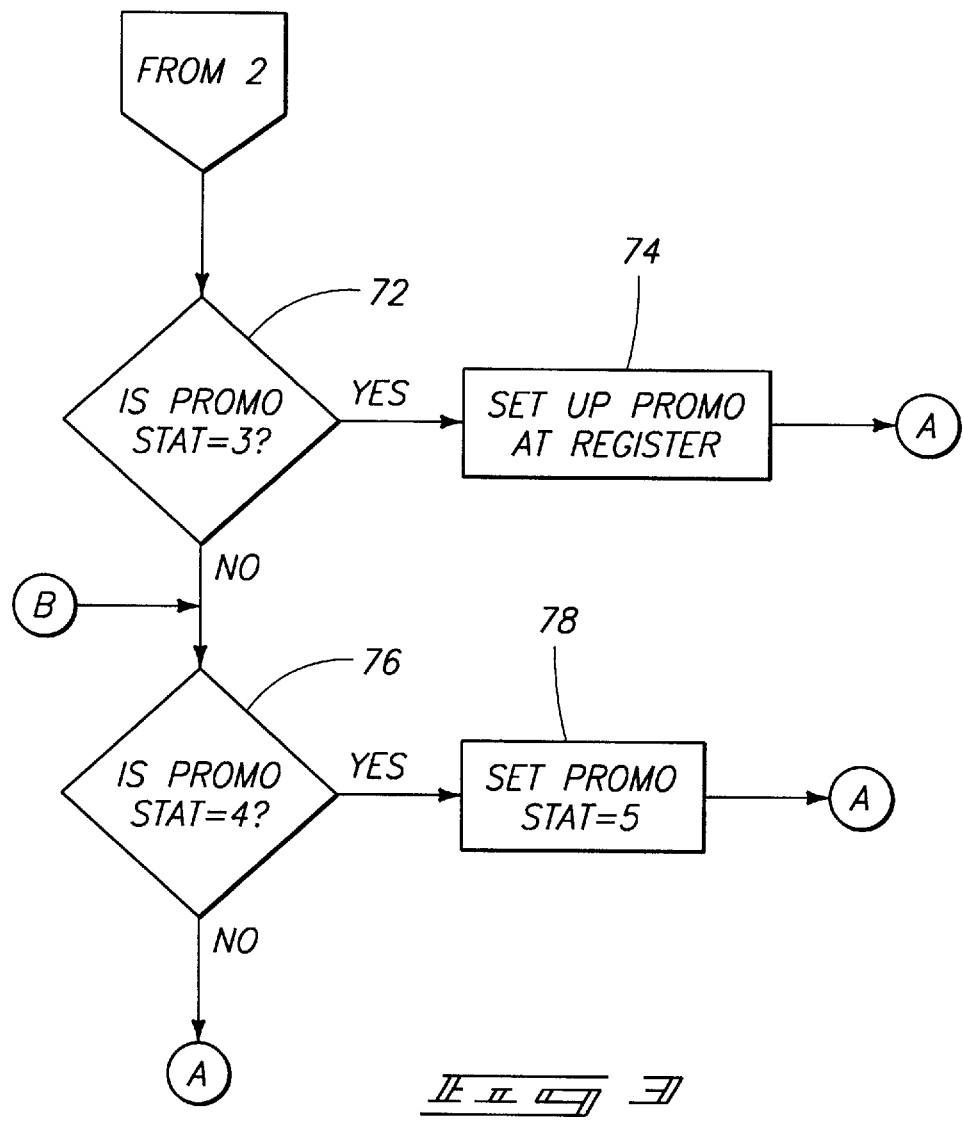

FIGS. 2–3 are flow charts illustrating store level 14 promotional staging. This staging operation is used to tell the system 10 which products to discount. Category exclusivity is provided. Automatic increasing of the value of special offers, if customers reject special offers is set up during the store level staging. Any of the computer systems (14, 20, or 16) containing the customer purchase history may be used to target recipients of a promotion. If targeting takes place anywhere other than on a store level computer, either the list of targeted customers is transmitted to each appropriate store level computer, or the targeting process itself must be repeated at each store level computer. The staging of promotional products at the check-out 34 takes place only at the store level computers that will support the promotion.

A special status flag (stat) is used to indicate the status of a particular promotion at a particular point in time. This status flag determines what action, if any, is to be taken for a given promotion. In the embodiment represented by FIGS. 2 and 3, the following meaning of the status flag values are used:

| Status Value | Meaning |
| --- | --- |
| 0 | The promotion is still in the configuration process, and is not to be staged or targeted. |
| 1 | The promotion is fully defined, and will be staged at the check-out 34 system when the promotion becomes effective. |
| 2 | The promotion has been staged at the check-out 34, and is now ready to be targeted to the households that qualify for the promotion. |
| 3 | The promotion is fully staged; it may appear at the offer communicator 32 or the kiosks 26, and may be discounted at the check-out 34. The promotion will normally remain active until its expiration. |
| 4 | The promotion has expired, and has been "de-staged" at the check-out 34 system. |
| 5 | The promotion is fully decommissioned. |
| 6 | The promotion has been suspended. |
| 7 | The promotion has been suspended. |
| 8 | The promotion is ready to be deleted from the computer system. |

At step 50 a promotion (special offer) is read from the database. If no more promotions exist, every promotion with a status of "2" will now be targeted to the appropriate qualifying households (at step 52).

At step 54, a determination is made whether the special offer is expired. If so, the system proceeds to step 56; if not, the system proceeds to step 62.

At step 56, a determination is made whether the promotion was fully active ("stat=3"). If not, the system proceeds to step 76; if so, the system proceeds to step 58.

At step 58, the next UPC value of the special offer is read, and a share builder flag (indicating that this is a special offer) is turned off at the check-out 34 at step 68. If no more UPCs exist for the promotion, the system proceeds to step 60.

At step 59, a determination is made whether the promotion effective date has been reached. If so, the system proceeds to step 62; if not, the system proceeds to step 50.

At step 60, the status flag is set to 4 and the system proceeds to step 76.

At step 62, a determination is made whether the promotion should be staged at the check-out 34. If so, the system proceeds to step 64; if not, the system proceeds to step 70.

At step 64, the special offer is set up at the check-out 34 so that the check-out 34 is given an indication that it should look up a special offer when a customer buys a product bearing this UPC symbol.

At step 66, a flag ("stat=2") is set for the special offer. After performing 66, the system proceeds to step 50 where the next special offer is read.

At step 70, the determination is made whether the promotion has been set up (staged) at the check-out 34. If so, the system proceeds to step 50, where the next promotion is read; if not, the system proceeds to step 72.

At step 72, the determination is made whether the promotion is fully active (it is staged at the check-out 34 and has been targeted to qualifying households). If so, the system proceeds to step 74; if not, the system proceeds to step 76.

At step 74, the special offer is set up at the check-out 34 again, just in case the check-out 34 set-up was lost. After performing step 74, the system proceeds to step 50, where the next promotion is read.

At step 76, a determination is made whether the promotion has just been de-staged at the check-out 34. If so, the system proceeds to step 78; if not, the system proceeds to step 50.

At step 78, a flag ("stat=5") is set for this special offer, to indicate that the promotion is now fully de-activated. After performing step 78, the system proceeds to step 50.

Figure 4:
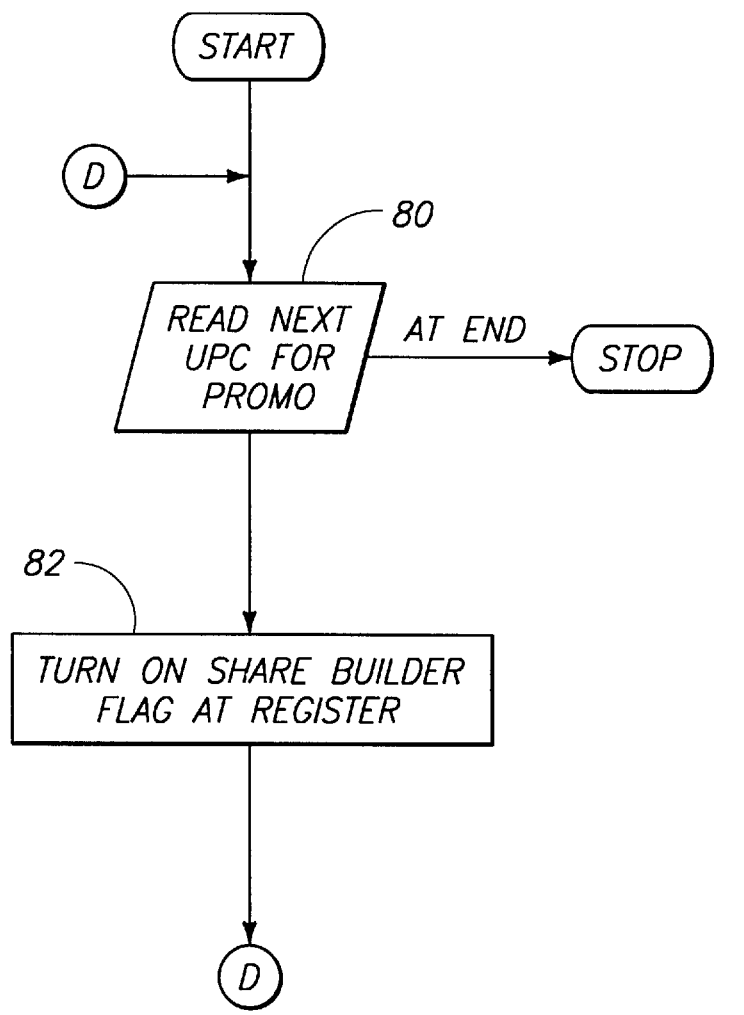
FIG. 4 is a flow chart illustrating a promotion set up at a check-out register.

FIG. 4 is a flow chart illustrating a promotion set up at a check-out register. When a special offer goes into effect, a flag is sent to the check-out 34 that indicates that the product is potentially discounted.

At step 80, the next UPC of the promotion is read, and at step 82, a share builder flag (indicating that a special offer exists for this UPC) is set at the check-out 34. The system then proceeds back to step 80.

Figure 5:
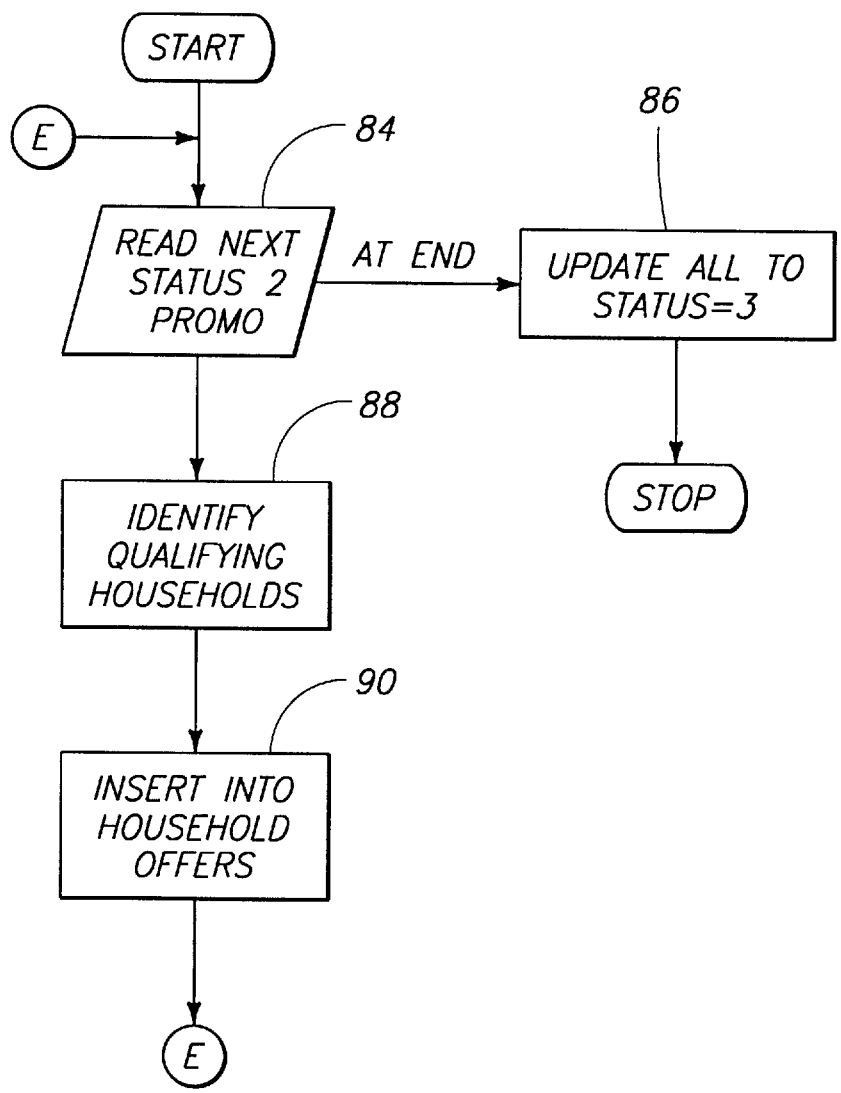
FIG. 5 is a flow chart illustrating identifying customers qualifying for special offers.

FIG. 5 is a flow chart illustrating identifying customers qualifying for special offers. At step 84, a promotion having the flag ("stat=2") is read. At step 88, qualifying households for this special offer are identified according to the specifications of the promotion. At step 90, the special offer is inserted into the database of special offers available to each qualifying household. After performing step 90, the system proceeds to step 84 where the next status 2 special offer is read. After all "stat=2" special offers are read, the system proceeds to step 86 where all these status 2 special offers are updated to status 3 ("stat=3").

FIGS. 6–10 are flow charts illustrating activity at a kiosk which a customer uses to obtain a list of special offers. The kiosk supports price look-up, wherein the kiosk can be used to scan a product to check the price of the product. When a customer presents a card to the kiosk, a determination is made whether the customer is at the customer's home store. If not, this customer can be added to the database for this store. Special offers are printed on a shopping list for the customer. The number of special offers printed is kept below a certain number.

At step 92, a welcome message is displayed at the kiosk 26. After performing step 92, the system proceeds to step 94.

At step 94, a UPC is scanned by the card reader 28.

At step 96, a determination is made whether the UPC is a formal UPC. If so, the system proceeds to step 108; if not, the system proceeds to step 98.

At step 98, a determination is made whether this kiosk 26 supports the possibility of looking up prices of products (instead of only reading the cards 22). If not, the system proceeds to step 100; if so, the system proceeds to step 102.

At step 100, the kiosk 96 displays that the price look-up of products is not supported. After performing step 100, the system proceeds to step 92.

In step 102, a determination is made whether a UPC is on file for the product presented to the kiosk 26. If so, the system proceeds to step 106; if not, the system proceeds to step 104.

At step 104, the kiosk 26 displays that the UPC for this product is not on file. After performing step 104, the system proceeds to step 92.

At step 106, the description and price of the product presented to the kiosk 26 is displayed at the kiosk 26. After performing step 106, the system proceeds to step 92.

At step 108, a determination is made whether the card 22 presented to the kiosk 26 is for this store. If so, the system proceeds to step 110; if not, the system proceeds to step 112.

At step 110, a determination is made whether this card number is on file. If so, the system proceeds to step 128; if not, the system proceeds to step 114.

At step 114, a determination is made whether this store has enabled automatic adding of card numbers. If so, the system proceeds to step 116; if not, the system proceeds to step 118.

At step 116, the card number is added to the database as a new member. After performing step 116, the system proceeds to step 128.

At step 118, the kiosk 26 displays that this card number is not on file. After performing step 118, the system proceeds to step 92.

At step 112, a visitor message is displayed indicating that the customer's offers are being retrieved from the customer's home store. After performing step 112, the system proceeds to step 120.

At step 120, cross-shopping requests are issued, where the store level computer 12 of this store communicates with the home store to determine what special offers are available for this visitor. After performing step 120, the system proceeds to step 122 where the system waits for a response. After waiting for a response, the system proceeds to step 124.

At step 124, a determination is made whether the cross-shopping request was successful. If so, the system proceeds to step 128; if not, the system proceeds to step 126.

At step 126, the kiosk 26 displays or communicates that there are no offers available. After performing step 126, the system proceeds to step 92.

At step 128, a determination is made whether the customer's offers are available for shopping. If so, the system proceeds to step 132; if not, the system proceeds to step 130.

At step 130, an error message is displayed at the kiosk 26, indicating the reason for the refusal to print the offer list. After performing step 130, the system proceeds to step 92.

At step 132, a personalized welcome message is displayed at the kiosk 26. After performing step 132, the system proceeds to step 134.

At step 136, the next active special offer of this customer is read. After performing step 136, the system proceeds to step 138. If no more offers are to be presented to this customer, the system proceeds to step 92.

At step 138, household activity for the household corresponding to the card 22 which was presented to the kiosk 26 is looked up for the promotion read at step 136. After performing step 138, the system proceeds to step 140.

At step 140, a determination is made whether activity was found for this household and for this special offer. If so, the system proceeds to step 142; if not, the system proceeds to step 146.

At step 142, a determination is made whether the purchasing activity of the household is within the limits required for this special offer. If so, the system proceeds to step 148; if not, the system proceeds to step 136.

At step 146, a determination is made whether the special offer is a targeted special offer. If so, the system proceeds to step 136; if not, the system proceeds to step 148.

At step 148, a determination is made whether the UPCs of this promotion have not yet been placed into the POS (point of sale) support table for this customer's shopping trip (i.e., is this the customer's first kiosk scan for this shopping trip?). If so (if this is the first kiosk scan for this shopping trip), the system proceeds to step 150; if not, the system proceeds to step 152.

At step 150, the special offer UPC information is inserted into a POS support table for the check-out 34, so that the store-level computer 12 knows how much of a discount is to be applied at the check-out 34 if the customer meets the purchase requirements of this promotion. After performing step 150, the system proceeds to step 152.

At step 152, this special offer is communicated to the customer by the offer communicator 32. After performing step 152, the system proceeds to step 154.

At step 154, a determination is made whether the maximum number of offers have been communicated to the customer at the offer communicator 32. If so, the system proceeds to step 108; if not, the system proceeds to step 136.

FIGS. 9 and 10 are flow charts representing the activity that takes place at the customer's home store level computer 12 when the customer scans the membership card 22 at the kiosk scanner 28 of a kiosk 26 which is not located in the customer's home store.

At step 156, a determination is made whether the card number is on file. If so, the system proceeds to step 164; if not, the system proceeds to step 158.

At step 158, a determination is made whether "Auto Add" is set (whether this store will allow card numbers to be automatically added to its database). If so, the system proceeds to step 160; if not, the system proceeds to step 162.

At step 160, this card number is added to the database. After performing step 160, the system proceeds to step 164.

At step 162, the system returns a negative response to the store level computer 12 which made the request. This process is now complete.

At step 164, a determination is made whether the customer's offers are available for shopping. If so, the system proceeds to step 166; if not, the system proceeds to step 162.

At step 166, the next cross-shoppable active special offer is read. If no more special offers exist, the system proceeds to step 182. Otherwise, the system proceeds to step 168.

At step 168 household activity is read for this special offer. After performing step 168, the system proceeds to step 170.

At step 170, a determination is made whether household activity was found for this special offer. If so, the system proceeds to step 174; if not, the system proceeds to step 172.

At step 172, a determination is made whether the special offer is a targeted special offer. If so, the system proceeds to step 166; if not, the system proceeds to step 178.

At step 174, a determination is made whether the activity is within the limits established for this special offer. If so, the system proceeds to step 178; if not, the system proceeds to step 176.

At step 176, a determination is made whether the special offer is non-targeted. If so, the system proceeds to step 178; if not, the system proceeds to step 166.

At step 178, information about this promotion and the household activity relating to this promotion are added to the cross-shopping reply message (which will be sent back to the requesting computer in step 182). After performing step 178, the system proceeds to step 180.

At step 180, a determination is made whether the cross-shopping response message is at its maximum size (e.g.: a predetermined number of special offers). If so, the system proceeds to step 182; if not, the system proceeds to step 166.

Figure 11A:
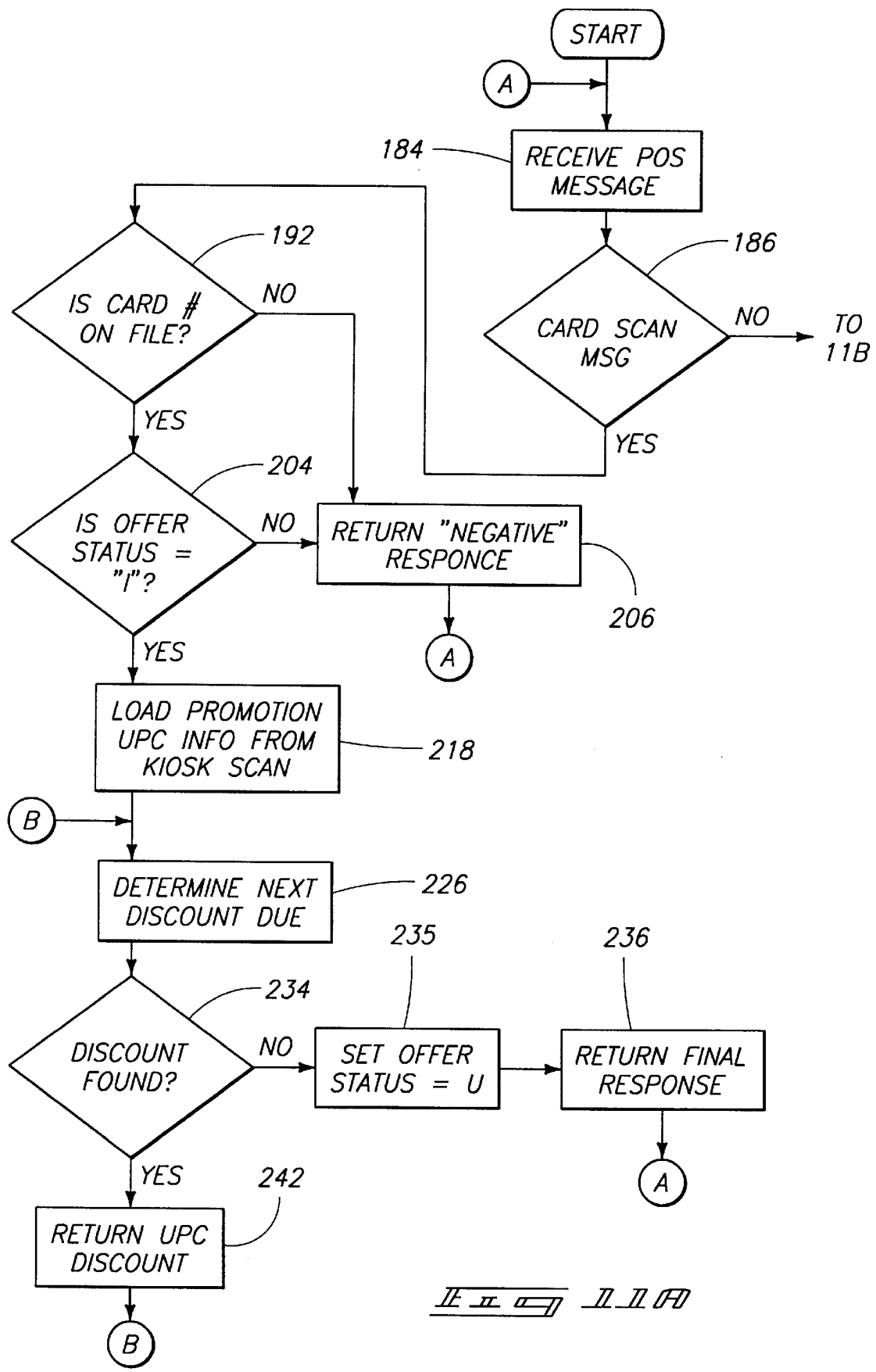
FIG. 11 consists of FIG. 11A, FIG. 11B, and FIG. 11C, and are flow charts illustrating processing that takes place at a store level computer when a check-out sends a message to the store level computer.
Figure 11B:
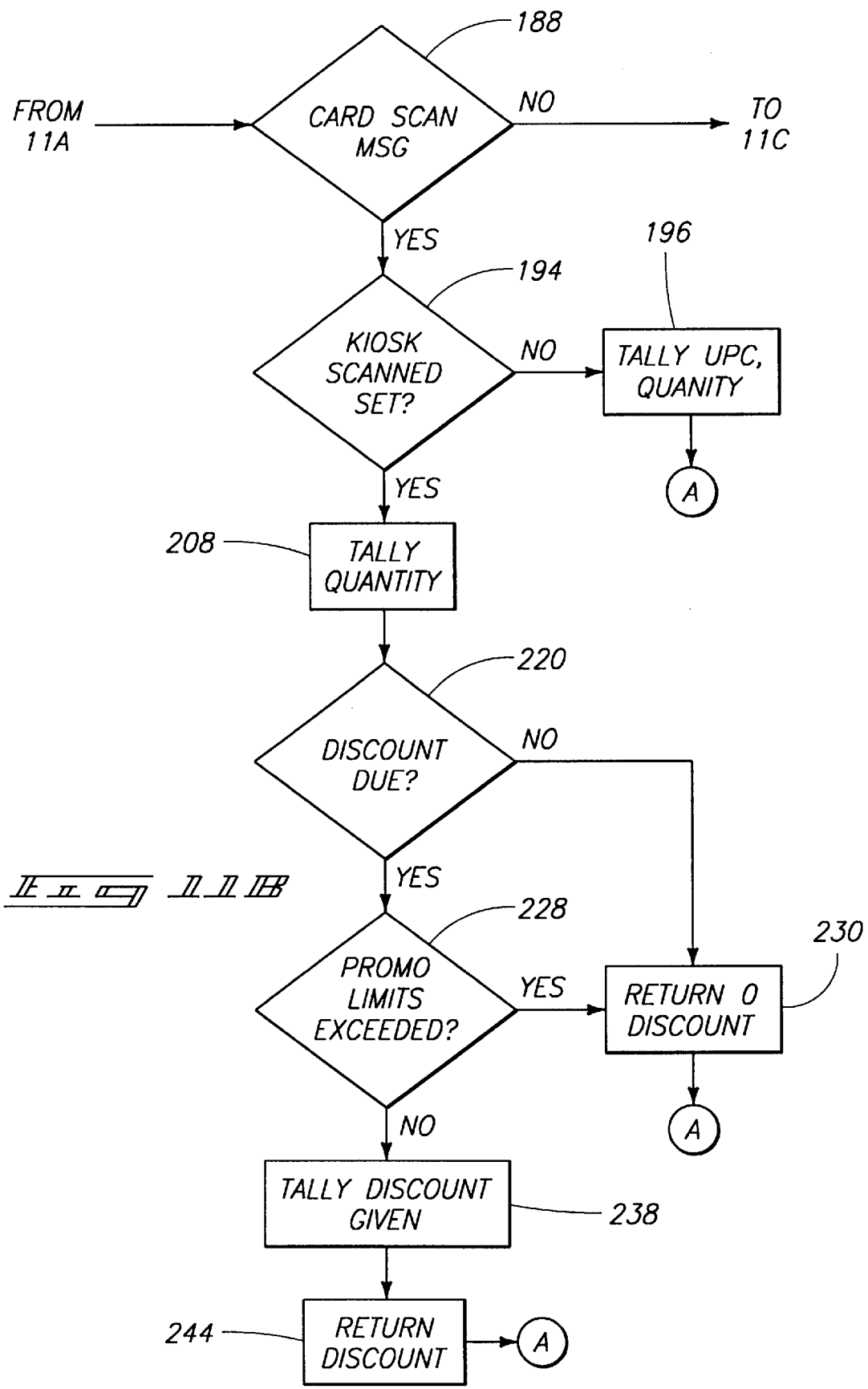

FIG. 11 consists of FIG. 11A, FIG. 11B, and FIG. 11C, and are flow charts illustrating processing that takes place at a store level computer when a check-out sends a message to the store level computer. When an item is scanned at the check-out, a determination is made as to whether it is a card 22, or a product. If it is a card 22, a determination is made as to whether it was scanned at a kiosk 26 (is offer status=I). If a product is scanned, a determination is made whether the customer met purchase requirements in order to be eligible for a special offer.

At step 184, a message is received from a check-out 34. After performing step 184, the system proceeds to step 186.

At step 186, a determination is made whether the item presented to the check-out 34 is one of the cards 22. If so, the system proceeds to step 192; if not, the system proceeds to step 188.

At step 188, a determination is made whether the item presented at the check-out 34 is a product. If so, the system proceeds to step 194; if not, the system proceeds to step 190.

At step 190, a determination is made whether a check-out close/resume message has been received indicating an end to the transaction at the check-out 34. If so, the system proceeds to step 198; if not, the system proceeds to step 184.

At step 192, a determination is made whether the card number for the card 22 presented to the check-out 34 is on file. If so, the system proceeds to step 204; if not, the system proceeds to step 206.

At step 204, a determination is made whether the card 22 was scanned at the kiosk 26. If so, the system proceeds to step 218; if not, the system proceeds to step 206.

At step 206, a negative response is returned indicating that special offers are not available to this customer. After performing step 206, the system proceeds to step 184.

At step 218, promotion information is read from the POS support table. After performing step 218, the system proceeds to step 226.

At step 226, the next discount due to this customer is determined based upon product UPC scans which preceded the card 22 scan. After performing step 226, the system proceeds to step 234.

At step 234, a determination is made whether a discount was found. If so, the system proceeds to step 242; if not, the system proceeds to step 235.

At step 242, the UPC and discount is returned. After performing step 242, the system proceeds to step 226.

At step 235, the consumer offer status is set to "U", preventing any other activity against this consumer's offers until the entire checkout is analyzed and accounted for (FIGS. 12–17). After performing step 235, the system proceeds to step 236.

At step 236, a final response is returned to the check-out 34. After performing step 236, the system proceeds to step 184.

At step 194, a determination is made whether the customer's card 22 has been scanned yet for this check-out. If so, the system proceeds to step 208; if not, the system proceeds to step 196.

At step 196, the UPC and quantity purchased is tallied. After performing step 196, the system proceeds to step 184.

At step 208, the quantity purchased for this particular product is tallied. After performing step 208, the system proceeds to step 220.

At step 220, a determination is made whether a discount is due for this product. If so, the system proceeds to step 228; if not, the system proceeds to step 230.

At step 228, a determination is made whether special offer limits have been exceeded. If so, the system proceeds to step 230; if not, the system proceeds to step 238.

At step 238, the discount given is tallied. After performing step 238, the system proceeds to step 244.

At step 244, the amount of the discount is returned to the check-out 34. After performing step 244, the system proceeds to step 184.

At step 230, a zero discount is returned to the check-out 34. After performing step 230, the system proceeds to step 184.

At step 198, a determination is made whether the closing was a normal closing. If so, the system proceeds to step 200; if not, the system proceeds to step 210.

At step 200, a determination is made whether the card 22 was successfully scanned at the check-out 34 as part of this check-out. If so, the system proceeds to step 202; if not, the system proceeds to step 214.

At step 202, the consumer offer status is set to "U". After performing step 202, the system proceeds to step 214.

At step 214, tallies are reset. After performing 214, the system proceeds to step 184.

At step 210, a determination is made whether the transaction was voided or canceled. If so, the system proceeds to step 212; if not, the system proceeds to step 222.

At step 212, a determination is made whether the card 22 was scanned at the check-out 34 as part of this check-out. If so, the system proceeds to step 216; if not, the system proceeds to step 224.

At step 216, the consumer's offer status is set back to "I". After performing step 216, the system proceeds to step 224.

At step 224, tallies are reset. After performing step 224, the system proceeds to step 184.

At step 222, a determination is made whether the transaction was suspended at the check-out 34. If so, the system proceeds to step 232; if not, the system proceeds to step 246.

At step 232, all information accrued for this check-out is moved into suspense. After performing step 232, the system proceeds to step 184.

At step 246, a determination is made whether the transaction has been resumed at the check-out 34. If so, the system proceeds to step 248; if not, the system proceeds to step 184.

At step 248, information accrued for this check-out is restored from suspense. After performing step 248, the system proceeds to step 184.

FIGS. 12–14 are flow chart illustrating transactional analysis that takes place at a check-out (point of sale terminal). A determination is made whether a household has redeemed a special offer up to the maximum quantity for which the special offer was available. If so, the household will not see that special offer again unless the manufacturer reinstates it. After a check-out transaction is completed, and a sale is closed, the shopping history of the customer is updated, to reflect all purchases made by the customer. A determination can be made as to whether the customer accepted a special offer, passed on the special offer (did not make a purchase of any product for the category), or rejected the special offer (purchased a competitor's product).

At step 250, a completed point-of-sale transaction is read from the check-out 34. After performing step 250, the system proceeds to step 252.

At step 252, a database image is made of the point-of-sale transaction. After performing step 252, the system proceeds to step 254.

At step 254, a determination is made as to whether a card 22 was scanned at the check-out 34. If so, the system proceeds to step 258; if not, the system proceeds to step 256.

At step 256, the transaction is marked as a home non-member (in other words, this customer did not scan a card 22 at the check-out 34). After performing step 256, the system proceeds to step 282.

At step 258, the determination is made whether the card 22 that was scanned is for this store. If so, the system proceeds to step 268; if not, the system proceeds to step 260.

At step 260, a determination is made as to whether the store number on the card is a known store number. If so, the system proceeds to step 262; if not, the system proceeds to step 264.

At step 264, the transaction is marked as a transaction for a card having an unknown home store. After performing 264, the system proceeds to step 282.

At step 262, the transaction is marked as a transaction for a visitor from another home store. After performing step 262, the system proceeds to step 266.

At step 266, a determination is made whether this card number is on file as a visitor who scanned his or her card 22 at a kiosk 26. If so, the system proceeds to step 278; if not, the system proceeds to step 282.

At step 268, a determination is made whether this card number is on file as a home store customer. If so, the system proceeds to step 276. If not, the system proceeds to step 270.

At 270, a determination is made as to whether automatic addition of card numbers is set for this store. If so, the system proceeds to step 274; if not, the system proceeds to step 272.

At step 272, this transaction is marked as a transaction for a home non-member (a customer possessing a card for this store, for whom no account has yet been set up). After performing step 272 the system proceeds to step 282.

At step 274, the card number is added to the database. After performing step 274, the system proceeds to step 276.

At step 276, the transaction is marked as a transaction for a home member (a customer having this store as their home store). After performing step 276, the system proceeds to step 278.

At step 278, a determination is made whether the customer scanned his or her card 22 at both the kiosk 26 and at the check-out 34. If so, the system proceeds to step 280; if not, the system proceeds to step 282.

At step 280, the transaction is marked as a share-builder transaction (a transaction for which special offers may have been redeemed or discounted at the check-out 34). After performing step 280, the system proceeds to step 282.

Figure 16:
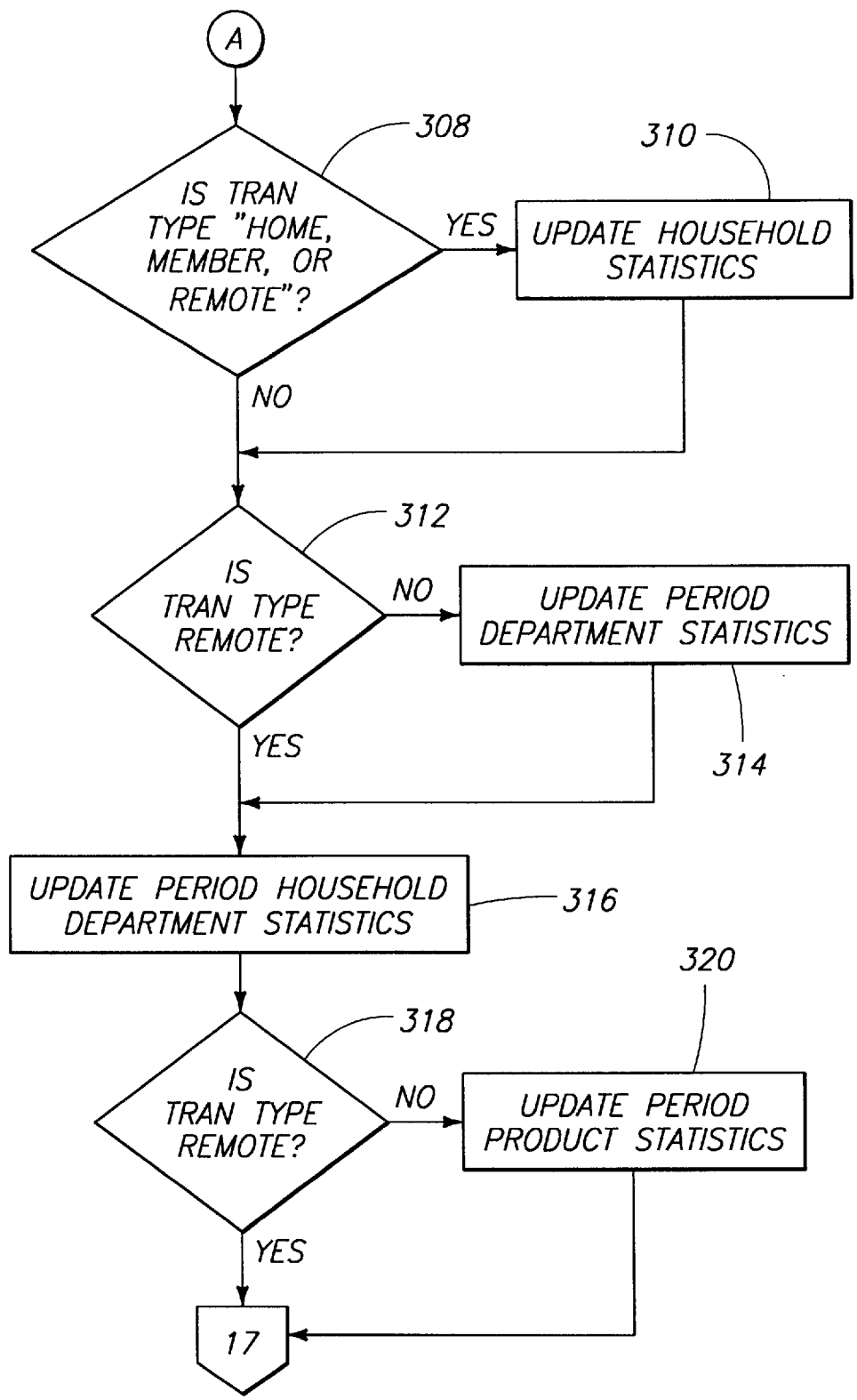
Figure 17:
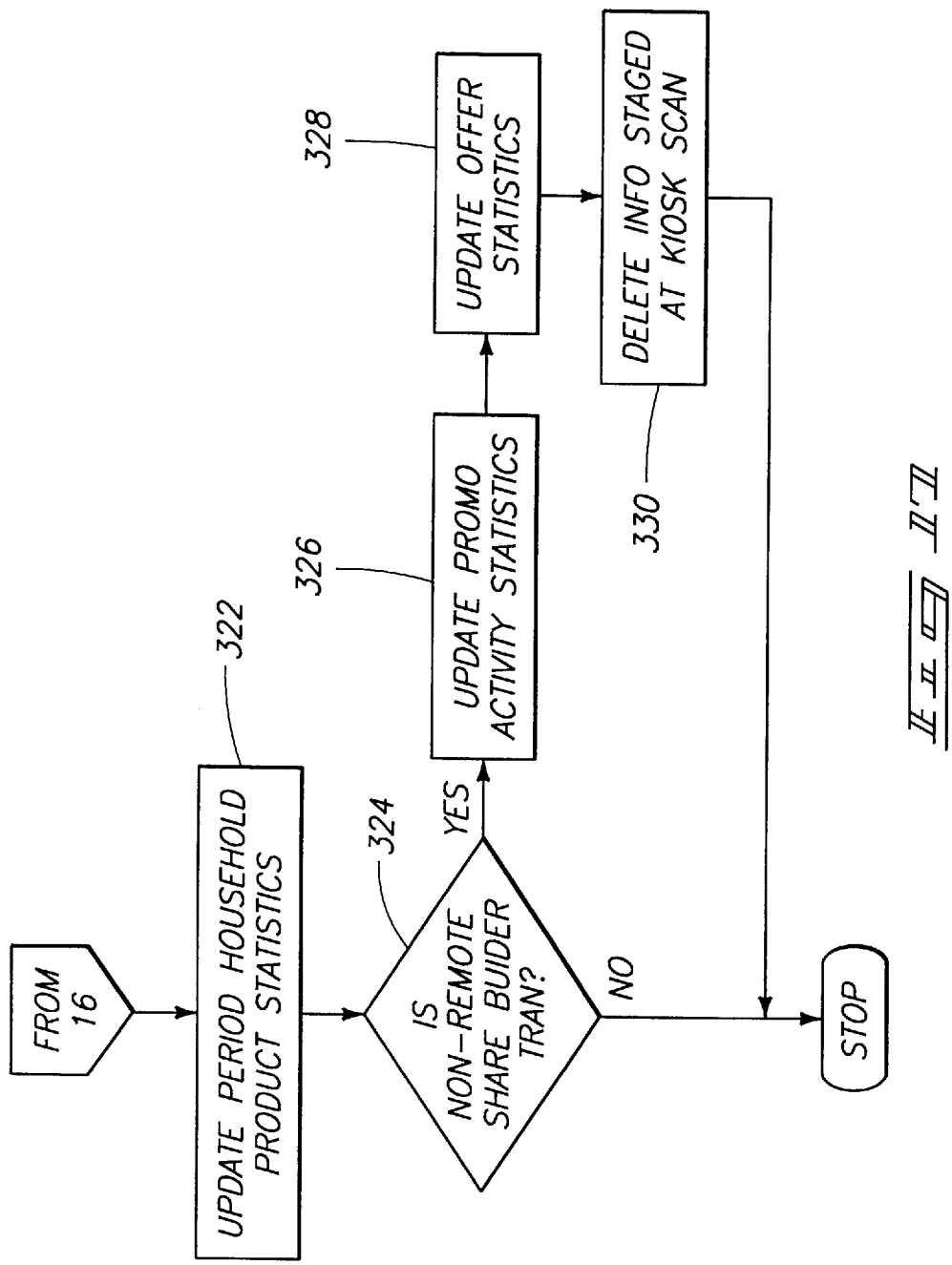

At step 282, database statistics are updated (see FIGS. 15–17). After performing step 282, the system proceeds to step 284.

At step 284, a determination is made as to whether this is a share-builder transaction (see step 280 for the definition of a share builder transaction). If so, the system proceeds to step 286; if not, the system proceeds to step 288.

At step 286, the customer offer status is set to "A", to allow subsequent activity against the customer's targeted offers. After performing step 286, the system proceeds to step 288.

At step 288, a determination is made as to whether the transaction type is a visitor transaction. If so, the system proceeds to step 290; if not, this processing is completed.

At step 290, an image of the transaction is written to a "flat" file, to be sent to the customer's home store. After performing step 290, this processing is completed.

FIGS. 15–17 are flow charts illustrating updating of database statistics for a single POS transaction received from either a check-out 34 at this store or from another store (see step 290).

At step 292, the period number of this transaction is determined. After performing step 292, the system proceeds to step 294.

At step 294, daily activity statistics are updated based on this transaction's type. After performing step 294, the system proceeds to step 296.

At step 296, a determination is made whether the transaction is for a customer whose home store is this store. If so, the system proceeds to step 298; if not, the system proceeds to step 300.

At step 298, household-level life-to-date statistics are updated for this specific household, as identified by the card 22 scanned at the check-out 34. After performing step 298, the system proceeds to step 300.

At step 300, period-based household-level statistics are updated. After performing step 300, the system proceeds to step 302.

At step 302, a determination is made as to whether the transaction type is a remote transaction (a transaction sent to this store from another store, for a customer whose home store is this store). If so, the system proceeds to step 306; if not, the system proceeds to step 304.

At step 304, store-level period-based category-related statistics are updated. After performing step 304, the system proceeds to step 306.

At step 306, period-based household-level category-related statistics are updated. After performing step 306, the system proceeds to step 308.

At step 308, a determination is made as to whether the transaction type is a home member, or remote transaction type. If so, the system proceeds to step 310; if not, the system proceeds to step 312.

At step 310, household-level statistics are updated. After performing step 310, the system proceeds to step 312.

At step 312, a determination is made as to whether the transaction type is a remote transaction type. If so, the system proceeds to step 316; if not, the system proceeds to step 314.

At step 314, store-level period-based department-related statistics are updated. After performing step 314, the system proceeds to step 316.

At step 316, period-based household-level department-related statistics are updated. After performing step 316, the system proceeds to step 318.

At step 318, a determination is made as to whether the transaction type is a remote transaction. If so, the system proceeds to step 322; if not, the system proceeds to step 320.

At step 320, store-level period-based product-related statistics are updated. After performing step 320, the system proceeds to step 322.

At step 322, period-based household-level product-related statistics are updated. After performing step 322, the system proceeds to step 324.

At step 324, a determination is made as to whether this transaction is a non-remote share-builder transaction. If so, the system proceeds to step 326; if not, this processing is complete.

At step 326, promotional activity statistics are updated. After performing step 326, the system proceeds to step 328.

At step 328, offer statistics are updated for either the home store customer or for the visitor customer. After performing step 328, the system proceeds to step 330.

At step 330, information staged at a kiosk scan are deleted from the POS support table. After performing step 330, processing is completed.

Figure 18:
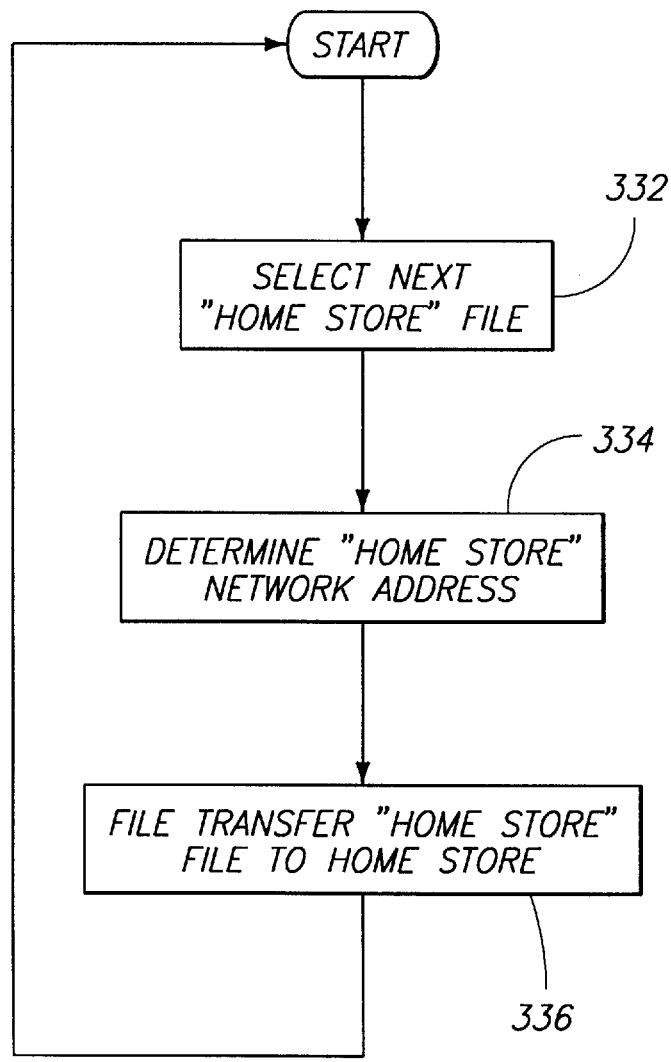
FIG. 18 is a flow chart illustrating file transfer to a home store.

FIG. 18 is a flow chart illustrating the file transfer of shopping trips for visitors from another home store back to their home store, for further analysis at that home store. Whether a customer scanned a card 22 at a kiosk 26 or not, the purchasing history for the customer, or the household, is updated if the customer shops at a store other than the customer's home store and scans the card 22 at a check-out 34 at that (remote) store.

At step 332, the next home store file is selected. After performing step 332, the system proceeds to step 334.

At step 334, the home store network address is determined. After performing step 334, the system proceeds to step 336.

At step 336, the file is transferred to the proper home store. After performing step 336, the system proceeds to step 332 where the next home store file is selected.

Figure 19:
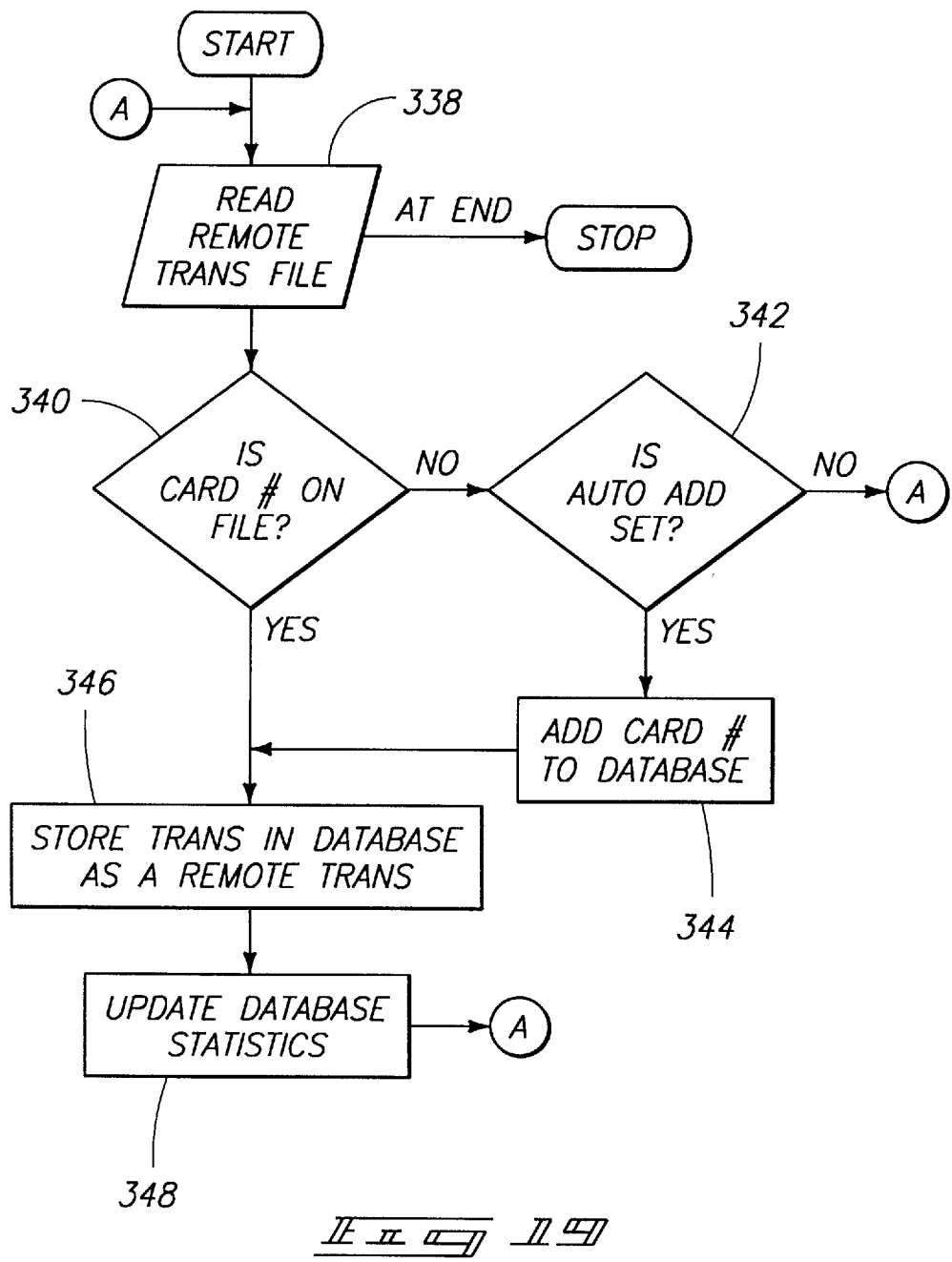
FIG. 19 is a flow chart illustrating remote transaction analysis.

FIG. 19 is a flow chart illustrating remote transaction analysis, or the analysis of shopping trips made at another store by customers of this home store.

At step 338, a remote transaction file is read. If no more shopping trips are in the file, processing terminates. After performing step 338, the system proceeds to step 340.

At step 340, a determination is made as to whether the card number is on file. If so, the system proceeds to step 346; if not, the system proceeds to step 342.

At step 342, a determination is made as to whether automatic addition of card number is permitted. If so, the system proceeds to step 344; if not, the system proceeds to step 338.

At step 344, the card number is added to the database as a "new member". After performing step 344, the system proceeds to step 346.

At step 346, the transaction is stored in the database as a remote transaction shopping trip. After performing step 346, the system proceeds to step 348.

At step 348, database statistics are updated (see FIGS. 15–17). After performing step 348, the system proceeds to step 338.

Figure 20:
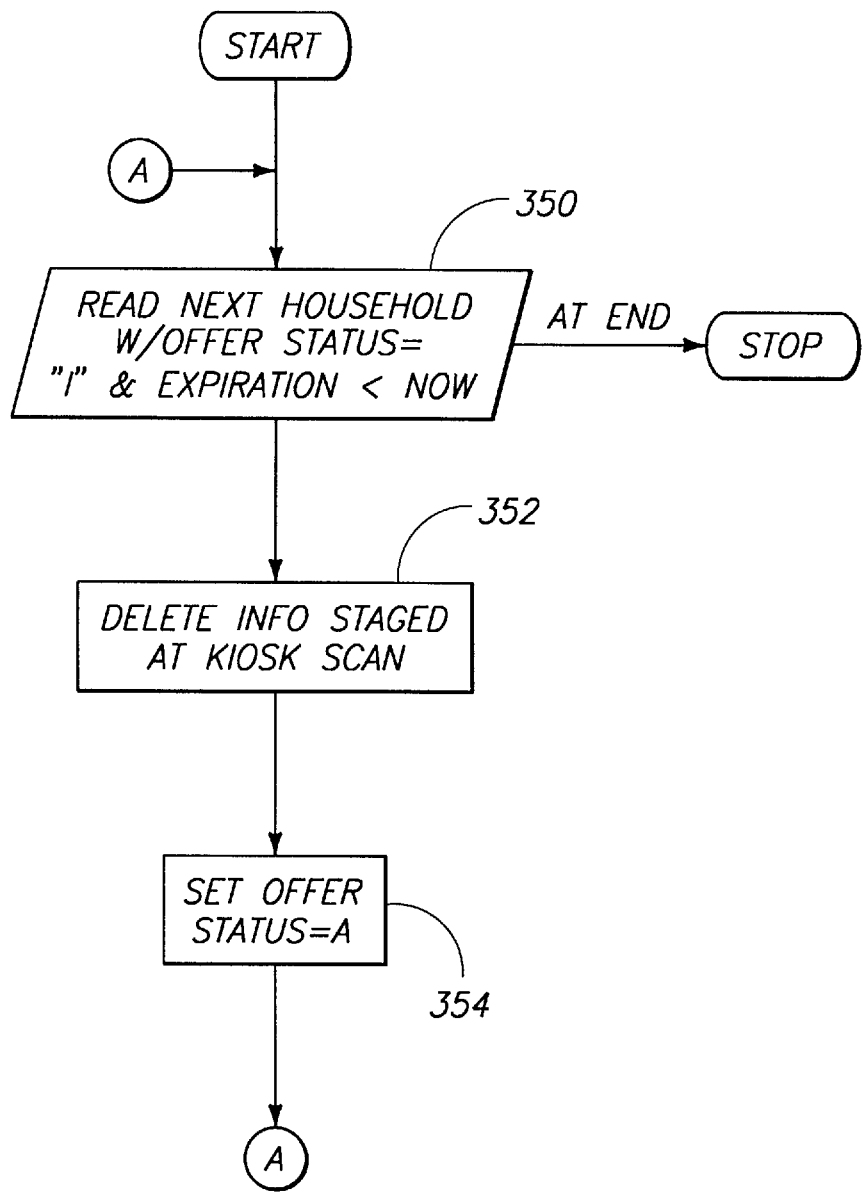
FIG. 20 is a flow chart illustrating deletion of expired special offers.

FIG. 20 is a flow chart illustrating deletion of expired special offers. Special offers are valid for a predetermined amount of time after a customer presents a card 22 to the kiosk 26. If the customer does not then present the card 22 to the check-out 34 within a predetermined amount of time, the special offers are canceled by the store level computer 12.

At step 350, the next household or visitor household with the flag ("stat=I") and offer expiration < now is read. If no more households meet the criteria, processing terminates. After performing step 350, the system proceeds to step 352.

At step 352, information staged at a kiosk scan is deleted from the POS support table. After performing step 352, the system proceeds to step 354.

At step 354, the customer offer status is set back to "A". After performing step 354, the system proceeds to step 350.

Figure 21:
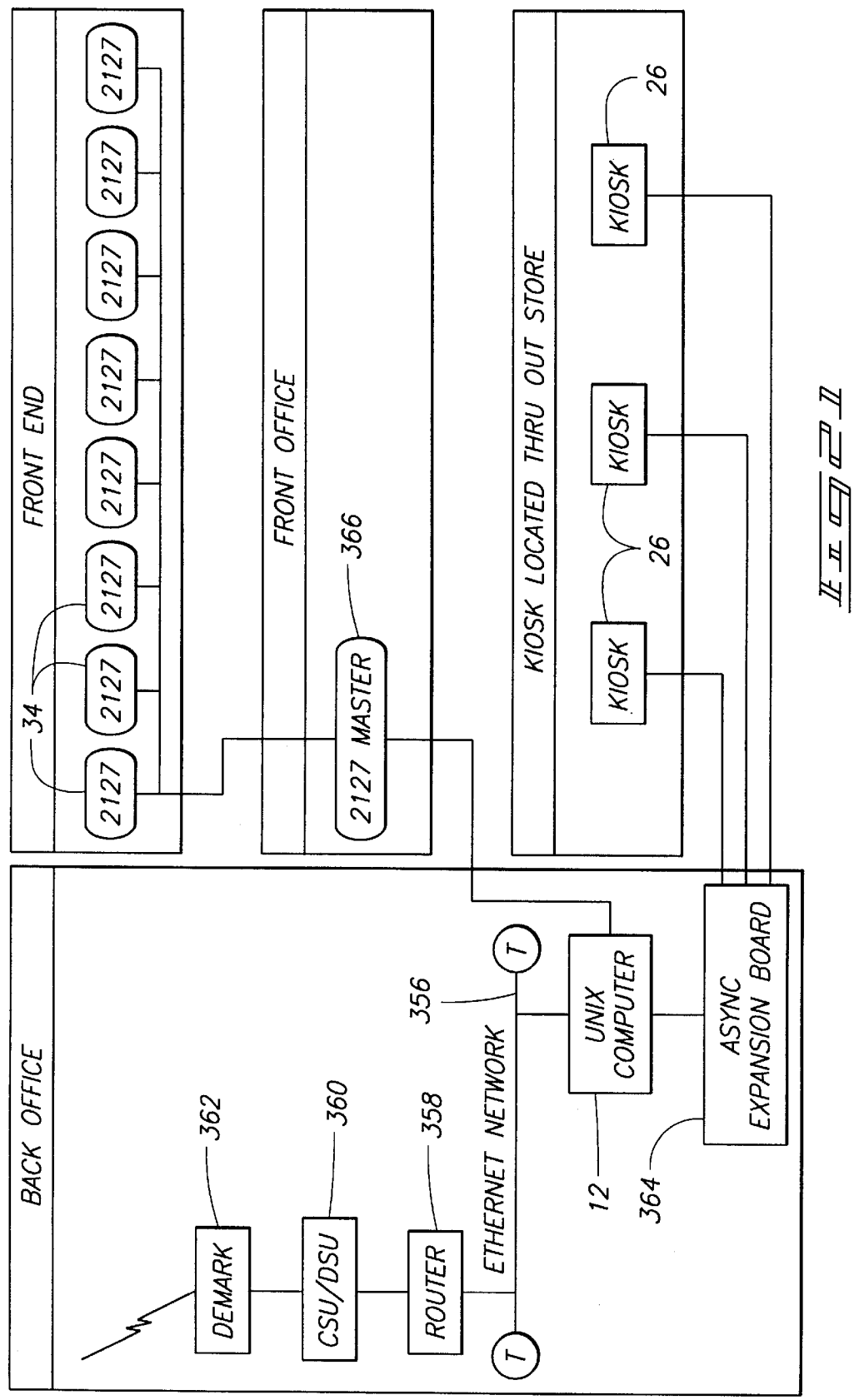
FIG. 21 is a block diagram illustrating hardware components and cabling for a store employing NCR (trademark) check-outs.

FIG. 21 is a block diagram illustrating hardware components and cabling that could be employed in a store employing NCR (trademark) check-outs 34. The store level computer 12 communicates with check-outs 34 via a 2127 master 366. The store level computer 12 also communicates with kiosks 26 via an asynchronous expansion board 364. The store level computer 12 is connected to an ethernet network 356, and communicates with a supervisory computer 16 via a router 358, a CSU/DSU 360 connected to the router, and a DEMARK 362 connected to the CSU/DSU, the router being connected to the ethernet network.

FIG. 22 is a block diagram illustrating hardware components and cabling that could be employed in a store employing IBM (trademark) check-outs. The store level computer 12 communicates with check-outs 34 via a token ring store loop. The store level computer 12 also communicates with kiosks 26 via an asynchronous expansion board 368. The store level computer 12 is connected to an MAU 370, and communicates with a supervisory computer 16 via a router 372, a CSU/DSU 374 connected to the router 372, and DEMARK 376 connected to the CSU/DSU, the router 372 being connected to the MAU. The MAU 370 is connected to a 4680 controller 372 and a front office of the store, and the MAU 370 is connected to a 4680 controller 374 in the back office of the store. The 4680 controller 374 is connected to the store loop 376, and thus to the check-outs 34.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A system for presenting customized special offers to customers, the special offers including targeted offers to a customer selected from a plurality of customers, and for collecting purchasing behavior information concerning the customers, the system comprising:

at least one computer including a database containing customer account information providing information specific to a particular customer account;

said at least one computer also including a database containing special offers including at least one targeted offer which is to be made to selected customer accounts on the basis of targeted offer targeting parameters;

a plurality of customer cards, each customer card having machine readable card information indicating at least identification of the card with a particular customer account;

a customer interface in communication with said at least one computer to transfer data therebetween, said customer interface having at least one card reader for reading machine readable card information from said customer card;

said at least one computer including means for generating a customized customer offer list available to that particular customer account which includes at least one said special offer;

at least one offer communicator for communicating said customer offer list to the customer for which it is generated;

at least one check-out at which the customer presents purchased item information indicating items being purchased by the customer; said check-out including a card reader for reading said customer card;

said at least one computer including means for sending information from the customized customer offer list to the at least one check-out;

said at least one computer further including means for collecting customer purchase information which is indicative of items being purchased by the customer via the check-out;

said at least one computer still further including means for editing said customer account information to reflect items purchased by the customer;

means for defining categories of products, and means for providing category exclusivity, wherein the system only permits special offers for one brand of product per category.

2. A system according to claim 1 and further comprising means for automatically increasing the value of a special offer available to a customer for a product if the customer previously did not purchase that product after the offer communicator communicated a discount for that product to the customer, and means for communicating the increased value special offer to the customer when the customer subsequently presents the customer's card to the customer interface.

3. A system in accordance with claim 1 wherein the offer communicator comprises a printer.

4. A system in accordance with claim 1 wherein the card reader of said check-out comprises a bar code reader in communication with the computer, the bar code reader reading the cards in addition to products, the system including means for associating a purchased item with a customer if one of the cards is scanned by the bar code reader in sequence with scanning of products.

5. A system in accordance with claim 4 wherein the check-out comprises means for totaling the costs of purchases, wherein the system includes means for associating a purchased item with a customer if one of the cards is scanned by the bar code reader in sequence with scanning of products, and wherein the system includes means for adjusting the customer's total to reflect special offers accepted by the customer, and for suspending the accepted special offers from the customer's offer list.

6. A system in accordance with claim 1 and further comprising means for recording that a special offer was not accepted by a customer if the customer does not present a product for which a special offer was available to the check-out within a predetermined amount of time after that customer accessed the customer interface.

7. A system in accordance with claim 1 wherein the special offers include broadcast, non-targeted, special offers which are generally available to all customers.

8. A system in accordance with claim 1 wherein the check-out includes a bar code reader, the system further comprising means for downloading, from the computer to the check-out, a list of all products for which special offers exist for at least one customer, means for associating a purchased item with a customer if one of the cards is scanned by the bar code reader in sequence with scanning of a product, means for accessing the computer in response to the bar code reader reading a product included in the list of all products for which special offers may be available and for determining the special offer available to that customer whose card was scanned at the check-out, for that particular product.

9. A system in accordance with claim 1 and further comprising means for maintaining and for communicating to each customer a running total of savings realized by that customer since the customer started using the card.

10. A system in accordance with claim 1 and further comprising means for maintaining for each customer a running total of savings realized by that customer since the customer started using the card, wherein the check-out communicates to each customer a running total of savings realized by that customer since the customer started using the card.

11. A system in accordance with claim 1 and further comprising means for establishing targeted offer targeting parameters in the form of criteria a customer must meet in order to be eligible for a particular targeted offer, and for determining which customers in the customer account database meet the criteria.

12. A system in accordance with claim 1 wherein the customer interface is spaced apart from the check-out.

13. A system in accordance with claim 1 and further comprising means for causing the offer communicator to communicate a predetermined number of special offers available to a particular customer in response to the customer presenting the customer's card to the customer interface, the predetermined number being the same for all customers who use the customer interface.

14. A system in accordance with claim 1 wherein the offer communicator comprises a printer, and wherein the system further comprises means for causing the printer to print a predetermined number of special offers available to a particular customer absent any selection by the customer accessing the customer interface, the predetermined number being the same for all customers that use the customer interface.

15. A system in accordance with claim 1 wherein the offer communicator comprises a printer, wherein the system further comprises means for sending to the printer a predetermined number of special offers available to a particular customer in response to the customer causing the card reader of the customer interface to read the customer's card, wherein the predetermined number is the same for all customers who use the customer interface, and wherein the predetermined number of special offers are the highest value special offers available to the particular customer.

16. A system in accordance with claim 1 wherein the offer communicator comprises a printer, wherein the system further comprises means for sending to the printer a predetermined number of special offers available to a particular customer in response to the customer causing the card reader of the customer interface to read the customer's card, wherein the predetermined number is the same for all customers who use the customer interface, and wherein the predetermined number of special offers are the highest value special offers available to the particular customer, calculated on the basis of percentage reduction in price.

17. A system in accordance with claim 1 and further comprising lottery means for randomly selecting customers for prize awards, the lottery means including means for causing the offer communicator to indicate to the customer the prize awarded.

18. A system in accordance with claim 1 and comprising a plurality of computers associated with a plurality of stores, wherein each customer is associated with one of the stores, wherein their card has machine readable information indicating their home store, and wherein the customer account information for the customers are respectively stored in the computers of their home stores.

19. A system in accordance with claim 1 wherein the offer communicator comprises a printer capable of printing at least 500 lines per minute.

20. A system in accordance with claim 1 and further comprising means for preventing a special offer from being communicated by the offer communicator if the product associated with the special offer is out of stock.

21. A system in accordance with claim 1 and further comprising means defining a frequent shopper program including means for providing points to customers based on usage of the customer interface.

22. A system in accordance with claim 1 and further comprising means for presetting a date and time on which a special offer will automatically expire.

23. A system in accordance with claim 1 and further comprising means for generating a report of the effectiveness of special offers in causing customers to purchase products.

24. A system in accordance with claim 1 and further comprising means for limiting the total dollar value of special offers for a particular product so that no more special offers are given for that product after a predetermined dollar value has been exceeded.

25. A system for presenting special offers to customers of a chain of stores, the special offers including customized targeted offers for specific customers, the system comprising:
   a plurality of store level computers, respective store level computers being associated with respective stores, the computers respectively including a database containing customer account information, and a database of special offers including customized targeted offers to be made to selected customer accounts on the basis of targeted offer targeting parameters;
   a supervisory computer networked to the store level computers, the supervisory computer periodically downloading special offers to the store level computers;
   a plurality of cards, each card having thereon machine readable information for associating the card with particular customer account information and with a particular store in the chain; and
   a plurality of customer interfaces, respective customer interfaces being located in respective stores and being in communication with the store level computer associated with that store, the interfaces having respective card readers including means for receiving the cards, for reading the machine readable information on the card, for sending information from the card to the store level computer associated with that store;
   the store level computers respectively including means for accessing information about the special offers available to the customer associated with the card in response to the card reader sending decoded information to the computer, for generating a customized list of special offers available to that particular customer;
   offer communicator means for communicating respective individualized lists of special offers to customers who access the customer interface;
   means for defining, using the supervisory computer, categories of products, and means for providing category exclusivity, wherein the system only permits special offers for one brand of product per category.

26. A system according to claim 25 and further comprising
   means for automatically increasing the value of a special offer available to a customer for a product if the customer previously did not purchase that product after one of the offer communicators communicated a discount for that product to the customer, and means for communicating the increased value special offer to the customer when the customer subsequently presents the customer's card to one of the customer interfaces.

27. A system in accordance with claim 25 wherein the offer communicator means comprise printers.

28. A system in accordance with claim 25 and further comprising check-outs in respective stores, wherein the check-outs respectively including bar code readers, wherein the check-outs are in communication with respective store level computers, wherein the bar code readers read the cards in addition to products, wherein the system includes means for associating a purchased product with a customer account if one of the cards is scanned by the bar code reader in sequence with scanning of products.

29. A system in accordance with claim 25 and further comprising check-outs in respective stores, the check-outs respectively including bar code readers, the check-outs being in communication with respective store level computers, wherein the check-out comprises means for totaling the costs of purchases, wherein the system includes means for associating a purchased item with a customer account if one of the cards is scanned by the bar code reader in sequence with scanning of products, and wherein the system includes means for adjusting the customer's total to reflect special offers accepted by the customer, and for deleting the accepted special offers from the customer's offer list.

30. A system in accordance with claim 29 and further comprising means for recording that a special offer was not accepted by a customer if the customer does not present a product for which a special offer was available to the check-out within a predetermined amount of time after that customer accessed the customer interface.

31. A system in accordance with claim 25 wherein the special offers include broadcast, non-targeted, special offers which are generally available to all customers.

32. A system in accordance with claim 29 wherein the system further comprising means for downloading, from the store level computers to the respective check-outs, a list of all products for which special offers exist for at least one customer, means for associating a purchased item with a customer account if one of the cards is scanned by one of the bar code readers in sequence with scanning of a product, means for accessing the store level computer in response to the bar code reader reading a product included in the list of all products for which special offers may be available and for determining the special offer available to that customer whose card was scanned at the check-out, for that particular product.

33. A system in accordance with claim 25 and further comprising means for maintaining and for communicating to each customer a running total of savings realized by that customer since the customer started using the card.

34. A system in accordance with claim 25 and further comprising means for maintaining for each customer a running total of savings realized by that customer since the customer started using the card, wherein the check-out communicates to each customer a running total of savings realized by that customer since the customer started using the card.

35. A system in accordance with claim 25 and further comprising means for establishing targeted offer targeting parameters in the form of criteria a customer must meet in order to be eligible for a particular targeted offer, and for determining which customers in the customer account databases meet the criteria.

36. A system in accordance with claim 25 wherein the customer interfaces are respectively spaced apart from the check-outs.

37. A system in accordance with claim 25 and further comprising means for causing one of the offer communicator means to print a predetermined number of special offers available to a particular customer in response to the customer presenting the customer's card to one of the customer interfaces, the predetermined number being the same for all customers who use the customer interfaces.

38. A system in accordance with claim 25 wherein the offer communicator means comprise respective printers, and wherein the system further comprises means for causing one of the printers to print a predetermined number of special offers available to a particular customer absent any selection by the customer accessing one of the customer interfaces, the predetermined number being the same for all customers who use that customer interface.

39. A system in accordance with claim 25 wherein the offer communicator means comprise respective printers, wherein the system further comprises means for sending to one of the printers a predetermined number of special offers available to a particular customer in response to the customer causing the card reader of one of the customer interfaces to read the customer's card, wherein the predetermined number is the same for all customers who use the customer interface, and wherein the predetermined number of special offers are the highest value special offers available to the particular customer.

40. A system in accordance with claim 25 wherein the offer communicator means comprise respective printers, wherein the system further comprises means for sending to one of the printers a predetermined number of special offers available to a particular customer in response to the customer causing the card reader of one of the customer interfaces to read the customer's card, wherein the predetermined number is the same for all customers who use the customer interface, and wherein the predetermined number of special offers are the highest value special offers available to the particular customer, calculated on the basis of percentage reduction in price.

41. A system in accordance with claim 25 and further comprising lottery means for randomly selecting customers for prize awards, the lottery means including means for causing the offer communicator means to indicate to the customer the prize awarded.

42. A system in accordance with claim 25 wherein the store level computers define home stores for customer accounts such that each customer account has one home store, wherein the cards further include machine readable information indicating their home store, and wherein the customer account information for the customers are respectively stored in the store level computers of their home stores.

43. A system in accordance with claim 25 wherein the store level computers define home stores for customer accounts such that each customer account has one home store, wherein the cards further include machine readable information indicating their home store, wherein the customer account information for the customers are respectively stored in the store level computers of their home stores, and wherein if a customer uses their card at a customer interface in a store other than their home store, the store level computer communicates with the customers home store and the customer's account is accessed even though the customer is not in their home store.

44. A system in accordance with claim 25 wherein the offer communicator means comprise respective printers capable of printing at least 500 lines per minute.

45. A system in accordance with claim 25 and further comprising means for preventing a special offer from being communicated by the offer communicator means if the product associated with the special offer is out of stock.

46. A system in accordance with claim 25 and further comprising means defining a frequent shopper program including means for providing points to customers based on usage of the customer interface.

47. A system in accordance with claim 25 and further comprising means for presetting a date and time on which a special offer will automatically expire.

48. A system in accordance with claim 25 and further comprising means for defining, using the supervisory computer, categories of products, and means for providing category exclusivity, wherein the system only permits special offers for one brand of product per category.

49. A system in accordance with claim 25 wherein the supervisor computer further comprises means for generating a report of the effectiveness of special offers in causing customers to purchase products.

50. A system for a chain of stores for presenting customized special offers to customers, the special offers including targeted offers to a customer selected from a plurality of customers, the system comprising:

a plurality of store level computers, respective store level computers being associated with respective stores, the store computers respectively including a database containing customer account information providing information specific to individual customers including information regarding customer purchases, the store level computers respectively including a database containing special offers including at least one targeted offer which is to be made to selected customer accounts on the basis of targeted offer targeting parameters;

a plurality of cards, each card having thereon machine readable information associating the card with a particular customer account and with a particular store in the chain;

regional computers networked to groups of store level computers, the regional computers periodically downloading special offers to the store level computers, groups of store level computers defining respective chains of stores;

a supervisory computer networked to the regional computers, the regional computers periodically downloading special offers to the store level computers;

a plurality of customer interfaces, respective customer interfaces being located in respective stores and being in communication with the store level computer associated with that store, the customer interfaces having respective card readers including means for receiving the cards, for reading the machine readable information on the cards, for sending the read information to the store level computer associated with that store;

a plurality of offer communicator means, respective offer communicator means being located in respective stores and being in communication with the store level computer associated with that store, respective offer communicator means being housed with respective customer interfaces;

means for accessing customer account information for a particular customer in response to the card reader sending read information to a store level computer, for generating an individualized list of special offers available to that particular customer, and for sending the list of special offers to the offer communicator housed with the card reader that sent the read information;

the customer interfaces respectively including means for communicating respective individualized lists of special offers to customers who access the customer interfaces;

check-outs, including respective bar code readers, connected to respective store level computers, the bar code readers reading the cards in addition to products, the system including means for associating a purchased item with a customer account if one of the cards is scanned by the bar code reader in sequence with scanning of products, for storing customer purchase information in the database in the store level computer; and means for uploading from the store level computers to the regional computers data identifying purchases made by individual customers;

means for defining, using the supervisory computer, categories of products, and means for providing category exclusivity within a chain, wherein the system only permits special offers for one brand of product per category in that chain.

51. A system according to claim 50 and further comprising means for automatically increasing the value of a special offer available to a customer for a product if the customer previously did not purchase that product after one of the offer communicators communicated a discount for that product to the customer, and means for communicating the increased value special offer to the customer when the customer subsequently presents the customer's card to one of the customer interfaces.

52. A system in accordance with claim 50 wherein the offer communicator means comprise printers.

53. A system in accordance with claim 50 wherein the check-outs respectively comprise means for totaling the costs of purchases, and wherein the system includes means for adjusting the customer's total to reflect special offers accepted by the customer, and for deleting the accepted special offers from the customer's offer list.

54. A system in accordance with claim 50 and further comprising means for recording that a special offer was not accepted by a customer if the customer does not present a product for which a special offer was available to a check-out within a predetermined amount of time after that customer accessed a customer interface.

55. A system in accordance with claim 50 wherein the special offers include broadcast, non-targeted, special offers which are generally available to all customers of a chain.

56. A system in accordance with claim 50 wherein the system further comprising means for downloading, from the store level computers to the respective check-outs, a list of all products for which special offers exist for at least one customer, means for accessing the store level computer in response to the bar code reader reading a product included in the list of all products for which special offers may be available and for determining the special offer available to that customer whose card was scanned at the check-out, for that particular product.

57. A system in accordance with claim 50 and further comprising means for maintaining and for communicating to each customer a running total of savings realized by that customer since the customer started using the card.

58. A system in accordance with claim 50 and further comprising means for maintaining for each customer a running total of savings realized by that customer since the customer started using the card, wherein the check-outs communicate to the customers a running total of savings realized by each customer since the customer started using the card.

59. A system in accordance with claim 50 and further comprising means for establishing targeted offer targeting parameters in the form of criteria a customer must meet in order to be eligible for a particular targeted offer, and for determining which customers in the customer account databases meet the criteria.

60. A system in accordance with claim 50 wherein the customer interfaces are respectively spaced apart from the check-outs in each store.

61. A system in accordance with claim 50 and further comprising means for causing one of the offer communicator means to print a predetermined number of special offers available to a particular customer in response to the customer presenting the customer's card to one of the customer interfaces, the predetermined number being the same for all customers of a chain who use the customer interfaces.

62. A system in accordance with claim 50 wherein the offer communicator means comprise respective printers, and wherein the system further comprises means for causing one of the printers to print a predetermined number of special offers available to a particular customer absent any selection by the customer accessing one of the customer interfaces, the predetermined number being the same for all customers who use that customer interface.

63. A system in accordance with claim 50 wherein the offer communicator means comprise respective printers, wherein the system further comprises means for sending to one of the printers a predetermined number of special offers available to a particular customer in response to the customer causing the card reader of one of the customer interfaces to read the customer's card, wherein the predetermined number is the same for all customers who use the customer interface, and wherein the predetermined number of special offers are the highest value special offers available to the particular customer.

64. A system in accordance with claim 50 wherein the offer communicator means comprise respective printers, wherein the system further comprises means for sending to one of the printers a predetermined number of special offers available to a particular customer in response to the customer causing the card reader of one of the customer interfaces to read the customer's card, wherein the predetermined number is the same for all customers who use the customer interface, and wherein the predetermined number of special offers are the highest value special offers available to the particular customer, calculated on the basis of percentage reduction in price.

65. A system in accordance with claim 50 and further comprising lottery means for randomly selecting customers for prize awards, the lottery means including means for causing the offer communicator means to indicate to the customer the prize awarded.

66. A system in accordance with claim 50 wherein the store level computers define home stores for customer accounts such that each customer account has one home store, wherein the cards further include machine readable information indicating their home store, and wherein the customer account information for the customers are respectively stored in the store level computers of their home stores.

67. A system in accordance with claim 50 wherein the store level computers define home stores for customer accounts such that each customer account has one home store, wherein the cards further include machine readable information indicating their home store, wherein the customer account information for the customers are respectively stored in the store level computers of their home stores, and wherein if a customer uses their card at a customer interface in a store other than their home store, the store level computer communicates with the customers home store and the customer's account is accessed even though the customer is not using the customer interface of their home store.

68. A system in accordance with claim 50 wherein the offer communicator means comprise respective printers capable of printing at least 500 lines per minute.

69. A system in accordance with claim 50 wherein the store level computers respectively include means for preventing a special offer from being communicated by the offer communicator means if the product associated with the special offer is out of stock.

70. A system in accordance with claim 50 and further comprising means defining a frequent shopper program including means for providing points to customers based on usage of the customer interface.

71. A system in accordance with claim 50 and further comprising means for presetting a date and time on which a special offer will automatically expire.

72. A system in accordance with claim 50 wherein the regional computer further comprises means for generating a report for a chain of the effectiveness of special offers in causing customers to purchase products.

73. A system for presenting customized special offers to customers, the special offers including targeted offers to a customer selected from a plurality of customers, and for collecting purchasing behavior information concerning the customers, the system comprising:

at least one computer including a database containing customer account information providing information specific to a particular customer account;

said at least one computer also including a database containing special offers including at least one targeted offer which is to be made to selected customer accounts on the basis of targeted offer targeting parameters;

means for identifying a customer, said means for identifying a customer being connected to communicate information to said at least one computer to associate a customer with a particular customer account;

a customer interface in communication with said at least one computer to transfer data therebetween;

said at least one computer including means for generating a customized customer offer list available to that particular customer account which includes at least one said special offer;

at least one offer communicator for communicating said customer offer list to the customer for which it is generated;

at least one check-out at which the customer presents purchased item information indicating items being purchased by the customer;

said at least one computer including means for sending information from the customized customer offer list to the at least one check-out;

said at least one computer further including means for collecting customer purchase information which is indicative of items being purchased by the customer via the check-out;

said at least one computer still further including means for editing said customer account information to reflect items purchased by the customer;

means for defining categories of products, and means for providing category exclusivity, wherein the system only permits special offers for one brand of product per category.

74. A system according to claim 73 and further comprising means for automatically increasing the value of a special offer available to a customer for a product if the customer previously did not purchase that product after the offer communicator communicated a discount for that product to the customer, and means for communicating the increased value special offer to the customer when the customer subsequently returns to the customer interface.

75. A system in accordance with claim 73 wherein the offer communicator comprises a printer.

76. A system in accordance with claim 73 wherein the check-out comprises means for totaling the costs of purchases, and wherein the system includes means for adjusting the customer's total to reflect special offers accepted by the customer, and for suspending the accepted special offers from the customer's offer list.

77. A system in accordance with claim 73, and further comprising means for recording that a special offer was not accepted by a customer if the customer does not present a product for which a special offer was available to the check-out within a predetermined amount of time after that customer accessed the customer interface.

78. A system in accordance with claim 73 wherein the special offers include broadcast, non-targeted, special offers which are generally available to all customers.

79. A system in accordance with claim 73 wherein the check-out includes a bar code reader, the system further comprising means for downloading, from the computer to the check-out, a list of all products for which special offers exist for at least one customer, means for associating a purchased item with a customer, means for accessing the computer in response to the bar code reader reading a product included in the list of all products for which special offers may be available and for determining the special offer available to that customer, for that particular product.

80. A system in accordance with claim 73 and further comprising means for maintaining and for communicating to each customer a running total of savings realized by that customer.

81. A system in accordance with claim 73 and further comprising means for maintaining for each customer a running total of savings realized by that customer, wherein the check-out communicates to each customer a running total of savings realized by that customer.

82. A system in accordance with claim 73 and further comprising means for establishing targeted offer targeting parameters in the form of criteria a customer must meet in order to be eligible for a particular targeted offer, and for determining which customers in the customer account database meet the criteria.

83. A system in accordance with claim 73 wherein the customer interface is spaced apart from the check-out.

84. A system in accordance with claim 73 and further comprising means for causing the offer communicator to communicate a predetermined number of special offers available to a particular customer, the predetermined number being the same for all customers who use the customer interface.

85. A system in accordance with claim 73 wherein the offer communicator comprises a printer, and wherein the system further comprises means for causing the printer to print a predetermined number of special offers available to a particular customer absent any selection by the customer accessing the customer interface, the predetermined number being the same for all customers that use the customer interface.

86. A system in accordance with claim 73 wherein the offer communicator comprises a printer, wherein the system further comprises means for sending to the printer a predetermined number of special offers available to a particular customer, wherein the predetermined number is the same for all customers who use the customer interface, and wherein the predetermined number of special offers are the highest value special offers available to the particular customer.

87. A system in accordance with claim 73 wherein the offer communicator comprises a printer, wherein the system further comprises means for sending to the printer a predetermined number of special offers available to a particular customer, wherein the predetermined number is the same for all customers who use the customer interface, and wherein the predetermined number of special offers are the highest value special offers available to the particular customer, calculated on the basis of percentage reduction in price.

88. A system in accordance with claim 73 and further comprising lottery means for randomly selecting customers for prize awards, the lottery means including means for causing the offer communicator to indicate to the customer the prize awarded.

89. A system in accordance with claim 73 and comprising a plurality of computers associated with a plurality of stores, wherein each customer is associated with one of the stores, and wherein the customer account information for the customers are respectively stored in the computers of their home stores.

90. A system in accordance with claim 73 wherein the offer communicator comprises a printer capable of printing at least 500 lines per minute.

91. A system in accordance with claim 73 and further comprising means for preventing a special offer from being communicated by the offer communicator if the product associated with the special offer is out of stock.

92. A system in accordance with claim 73 and further comprising means defining a frequent shopper program including means for providing points to customers based on usage of the customer interface.

93. A system in accordance with claim 73 and further comprising means for presetting a date and time on which a special offer will automatically expire.

94. A system in accordance with claim 73 and further comprising means for generating a report of the effectiveness of special offers in causing customers to purchase products.

95. A system in accordance with claim 73 and further comprising means for limiting the total dollar value of special offers for a particular product so that no more special offers are given for that product after a predetermined dollar value has been exceeded.

96. A system for presenting special offers to customers of a chain of stores, the special offers including customized targeted offers for specific customers, the system comprising:
   a plurality of store level computers, respective store level computers being associated with respective stores, the computers respectively including a database containing customer account information, and a database of special offers including customized targeted offers to be made to selected customer accounts on the basis of targeted offer targeting parameters;
   a supervisory computer networked to the store level computers, the supervisory computer periodically downloading special offers to the store level computers;
   means for identifying a customer, said means for identifying a customer being connected to communicate information to at least one of said store level computers to associate a customer with a particular customer account;
   a plurality of customer interfaces, respective customer interfaces being located in respective stores and being in communication with the store level computer associated with that store, and for sending information to the store level computer associated with that store;
   the store level computers respectively including means for accessing information about the special offers available to the customer, and for generating a customized list of special offers available to that particular customer;
   offer communicator means for communicating respective individualized lists of special offers to customers who access the customer interface;
   means for defining, using the supervisory computer, categories of products, and means for providing category exclusivity, wherein the system only permits special offers for one brand of product per category.

97. A system according to claim 96 and further comprising means for automatically increasing the value of a special offer available to a customer for a product if the customer previously did not purchase that product after one of the offer communicators communicated a discount for that product to the customer, and means for communicating the increased value special offer to the customer when the customer subsequently returns to the customer interface.

98. A system in accordance with claim 96 wherein the offer communicator means comprise printers.

99. A system in accordance with claim 96 and further comprising check-outs in respective stores, wherein the check-outs respectively including bar code readers, wherein the check-outs are in communication with respective store level computers, wherein the system includes means for associating a purchased product with a customer account.

100. A system in accordance with claim 96 and further comprising check-outs in respective stores, the check-outs respectively including bar code readers, the check-outs being in communication with respective store level computers, wherein the check-out comprises means for totaling the costs of purchases, wherein the system includes means for associating a purchased item with a customer account, and wherein the system includes means for adjusting the customer's total to reflect special offers accepted by the customer, and for deleting the accepted special offers from the customer's offer list.

101. A system in accordance with claim 96 and further comprising means for recording that a special offer was not accepted by a customer if the customer does not present a product for which a special offer was available to the check-out within a predetermined amount of time after that customer accessed the customer interface.

102. A system in accordance with claim 96 wherein the special offers include broadcast, non-targeted, special offers which are generally available to all customers.

103. A system in accordance with claim 96 and further comprising means for maintaining and for communicating to each customer a running total of savings realized by that customer.

104. A system in accordance with claim 96 and further comprising means for establishing targeted offer targeting parameters in the form of criteria a customer must meet in order to be eligible for a particular targeted offer, and for determining which customers in the customer account databases meet the criteria.

105. A system in accordance with claim 96 wherein the customer interfaces are respectively spaced apart from the check-outs.

106. A system in accordance with claim 96 and further comprising lottery means for randomly selecting customers for prize awards, the lottery means including means for causing the offer communicator means to indicate to the customer the prize awarded.

107. A system in accordance with claim 96 and further comprising means for preventing a special offer from being communicated by the offer communicator means if the product associated with the special offer is out of stock.

108. A system in accordance with claim 96 and further comprising means defining a frequent shopper program including means for providing points to customers based on usage of the customer interface.

109. A system in accordance with claim 96 and further comprising means for presetting a date and time on which a special offer will automatically expire.

110. A system in accordance with claim 96 wherein the supervisor computer further comprises means for generating a report of the effectiveness of special offers in causing customers to purchase products.

111. A system for a chain of stores for presenting customized special offers to customers, the special offers including targeted offers to a customer selected from a plurality of customers, the system comprising:

a plurality of store level computers, respective store level computers being associated with respective stores, the store computers respectively including a database containing customer account information providing information specific to individual customers including information regarding customer purchases, the store level computers respectively including a database containing special offers including at least one targeted offer which is to be made to selected customer accounts on the basis of targeted offer targeting parameters;

regional computers networked to groups of store level computers, the regional computers periodically downloading special offers to the store level computers, groups of store level computers defining respective chains of stores;

a supervisory computer networked to the regional computers, the regional computers periodically downloading special offers to the store level computers;

a plurality of customer interfaces, respective customer interfaces being located in respective stores and being in communication with the store level computer associated with that store;

means for identifying a customer, said means for identifying a customer being connected to communicate information to at least one of said store level computers to associate a customer with a particular customer account;

a plurality of offer communicator means, respective offer communicator means being located in respective stores and being in communication with the store level computer associated with that store, respective offer communicator means being housed with respective customer interfaces;

means for accessing customer account information for a particular customer, for generating an individualized list of special offers available to that particular customer, and for sending the list of special offers to the offer communicator means;

the customer interfaces respectively including means for communicating respective individualized lists of special offers to customers who access the customer interfaces;

check-outs, connected to respective store level computers, the system including means for associating a purchased item with a customer account, and for storing customer purchase information in the database in the store level computer; and means for uploading from the store level computers to the regional computers data identifying purchases made by individual customers;

means for defining, using the supervisory computer, categories of products, and means for providing category exclusivity within a chain, wherein the system only permits special offers for one brand of product per category in that chain.

112. A system according to claim 111 and further comprising means for automatically increasing the value of a special offer available to a customer for a product if the customer previously did not purchase that product after one of the offer communicators communicated a discount for that product to the customer.

113. A system in accordance with claim 111 wherein the offer communicator means comprise printers.

114. A system in accordance with claim 111 wherein the check-outs respectively comprise means for totaling the costs of purchases, and wherein the system includes means for adjusting the customer's total to reflect special offers accepted by the customer, and for deleting the accepted special offers from the customer's offer list.

115. A system in accordance with claim 111 and further comprising means for recording that a special offer was not accepted by a customer if the customer does not present a product for which a special offer was available to a check-out within a predetermined amount of time after that customer accessed a customer interface.

116. A system in accordance with claim 111 wherein the special offers include broadcast, non-targeted, special offers which are generally available to all customers of a chain.

117. A system in accordance with claim 111 wherein the system further comprising means for downloading, from the store level computers to the respective check-outs, a list of all products for which special offers exist for at least one customer, means for accessing the store level computer to provide a list of all products for which special offers may be available and for determining the special offer available to a particular customer for a particular product.

118. A system in accordance with claim 111 and further comprising means for maintaining and for communicating to each customer a running total of savings realized by that customer.

119. A system in accordance with claim 111 and further comprising means for establishing targeted offer targeting parameters in the form of criteria a customer must meet in order to be eligible for a particular targeted offer, and for determining which customers in the customer account databases meet the criteria.

120. A system in accordance with claim 111 wherein the customer interfaces are respectively spaced apart from the check-outs in each store.

121. A system in accordance with claim 111 and further comprising means for causing one of the offer communicator means to print a predetermined number of special offers available to a particular customer, the predetermined number being the same for all customers of a chain who use the customer interfaces.

122. A system in accordance with claim 111 and further comprising lottery means for randomly selecting customers for prize awards, the lottery means including means for causing the offer communicator means to indicate to the customer the prize awarded.

123. A system in accordance with claim 111 wherein the store level computers define home stores for customer accounts such that each customer account has one home store, and wherein the customer account information for the customers are respectively stored in the store level computers of their home stores.

124. A system in accordance with claim 111 wherein the store level computers respectively include means for preventing a special offer from being communicated by the offer communicator means if the product associated with the special offer is out of stock.

125. A system in accordance with claim 111 and further comprising means defining a frequent shopper program including means for providing points to customers based on usage of the customer interface.

126. A system in accordance with claim 111 and further comprising means for presetting a date and time on which a special offer will automatically expire.

127. A system in accordance with claim 111 wherein the regional computer further comprises means for generating a report for a chain of the effectiveness of special offers in causing customers to purchase products.

* * * * *